US010870977B2

(12) United States Patent
Meyers et al.

(10) Patent No.: US 10,870,977 B2
(45) Date of Patent: Dec. 22, 2020

(54) DRAIN SYSTEM FOR USE WITH A TILE FLOOR

(71) Applicant: EBBE AMERICA, LC, Clearfield, UT (US)

(72) Inventors: Alden S. Meyers, Clearfield, UT (US); Lawrence G. Meyers, Clearfield, UT (US)

(73) Assignee: EBBE AMERICA LC, Clearfield, UT (US)

( * ) Notice: Subject to any disclaimer, the term of this patent is extended or adjusted under 35 U.S.C. 154(b) by 0 days.

(21) Appl. No.: 16/682,074

(22) Filed: Nov. 13, 2019

(65) Prior Publication Data
US 2020/0173160 A1 Jun. 4, 2020

Related U.S. Application Data

(60) Provisional application No. 62/871,549, filed on Jul. 8, 2019, provisional application No. 62/775,245, filed on Dec. 4, 2018.

(51) Int. Cl.
E03F 5/04 (2006.01)

(52) U.S. Cl.
CPC ................... E03F 5/0408 (2013.01)

(58) Field of Classification Search
CPC ............... E03F 5/0408; E03F 5/041
USPC ...................................... 52/169.5
See application file for complete search history.

(56) References Cited

U.S. PATENT DOCUMENTS 8,043,497 B2  10/2011  Silverstein et al.
8,060,956 B2  11/2011  DeGooyer
8,191,330 B1*  6/2012  Cornwall .............. E03F 5/0407
                                                52/741.4
8,833,387 B2   9/2014  Lucas et al.
9,175,464 B2*  11/2015  Meyers ................. E03F 5/0408
9,453,331 B1*  9/2016  Buffington ............ E03F 5/0407
9,731,441 B2   8/2017  DeJesus et al.
9,848,742 B2  12/2017  Phillips
(Continued)

FOREIGN PATENT DOCUMENTS

FR        2979577        6/2016

OTHER PUBLICATIONS

International Search Report and Written Opinion for PCT/US2019/61084, dated Jan. 29, 2020.
(Continued)

Primary Examiner — Jeanette E Chapman
(74) Attorney, Agent, or Firm — Workman Nydegger

(57) ABSTRACT

A drain system includes a support frame installable in a tile floor that has a base portion and a wall portion that forms a seat for a drain cover within the support frame. The wall portion defines a cover-facing surface arranged to interface with the drain cover, and a tile-facing surface arranged to face one or more tiles surrounding the support frame. One or more material locking features are on the tile facing surface to help retain grout between the support frame and the surrounding tiles. During installation of the support frame in the tile floor, the vertical position of the support frame over the drain opening is adjustable and the support frame does not extend downwardly into the drain opening such that the support frame is floatable over the drain opening for lateral and rotational adjustment of the support frame relative to the drain opening.

19 Claims, 11 Drawing Sheets

(56) References Cited

U.S. PATENT DOCUMENTS

| | | | |
|---|---|---|---|
| 2007/0209109 A1* | 9/2007 | Meyers | E03F 5/0408 |
| | | | 4/613 |
| 2008/0189926 A1 | 8/2008 | Luxton | |
| 2008/0277324 A1* | 11/2008 | Meyers | E03F 5/0408 |
| | | | 210/164 |
| 2010/0235982 A1 | 9/2010 | Stimpson et al. | |
| 2010/0288685 A1 | 11/2010 | Meyers | |
| 2010/0320130 A1 | 12/2010 | Meyers | |
| 2014/0130902 A1* | 5/2014 | Lucas | E03F 5/0407 |
| | | | 137/363 |
| 2016/0281346 A1 | 9/2016 | Clear et al. | |
| 2017/0058504 A1* | 3/2017 | Wilkie | E03F 5/0404 |
| 2019/0242107 A1* | 8/2019 | McLeod | E03F 5/0407 |

OTHER PUBLICATIONS

Schluter®-Kerdi-Drain-AR; http://www.schulter.com/schluter-us/en_US/Shower-System/Drains/Schluter®-Kerdi-Drain-AR/p/KERDI_DRAIN-AR Retrieved on Dec. 19, 2016.

* cited by examiner

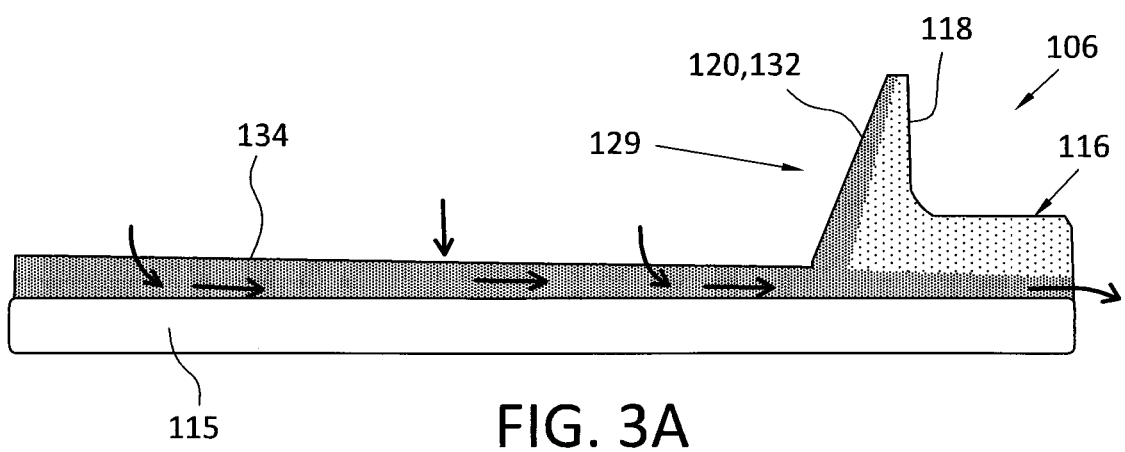
FIG. 3A
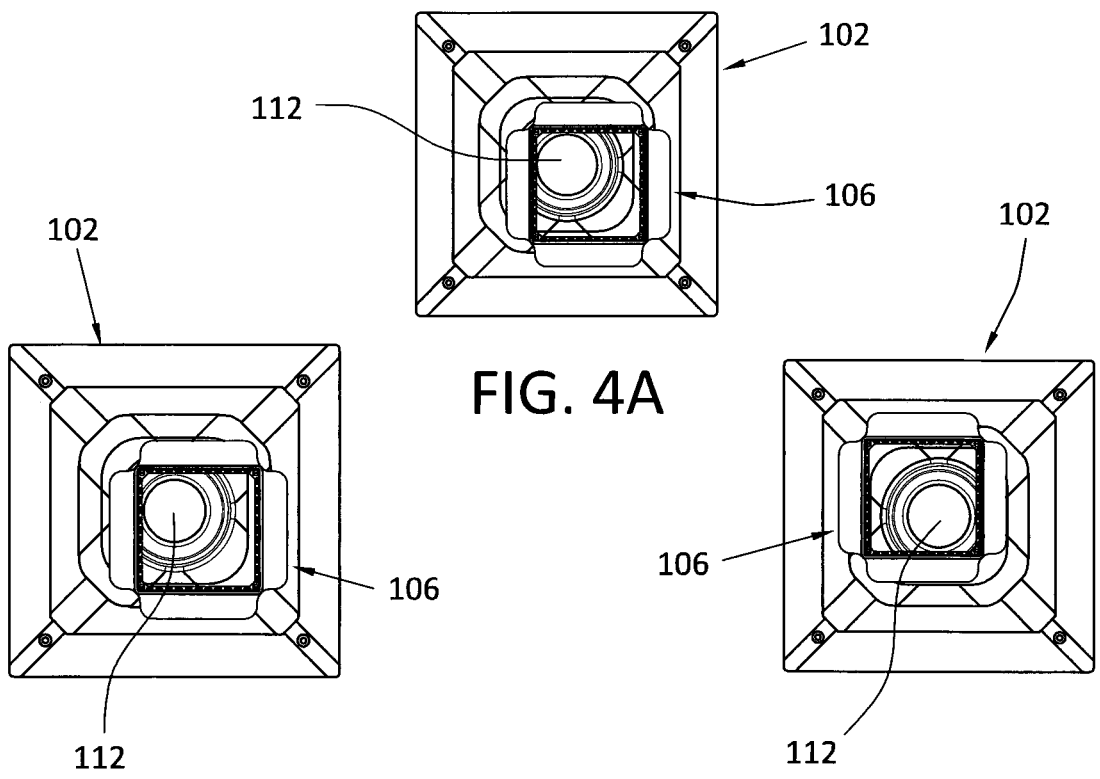
FIG. 4A
FIG. 4B
FIG. 4C

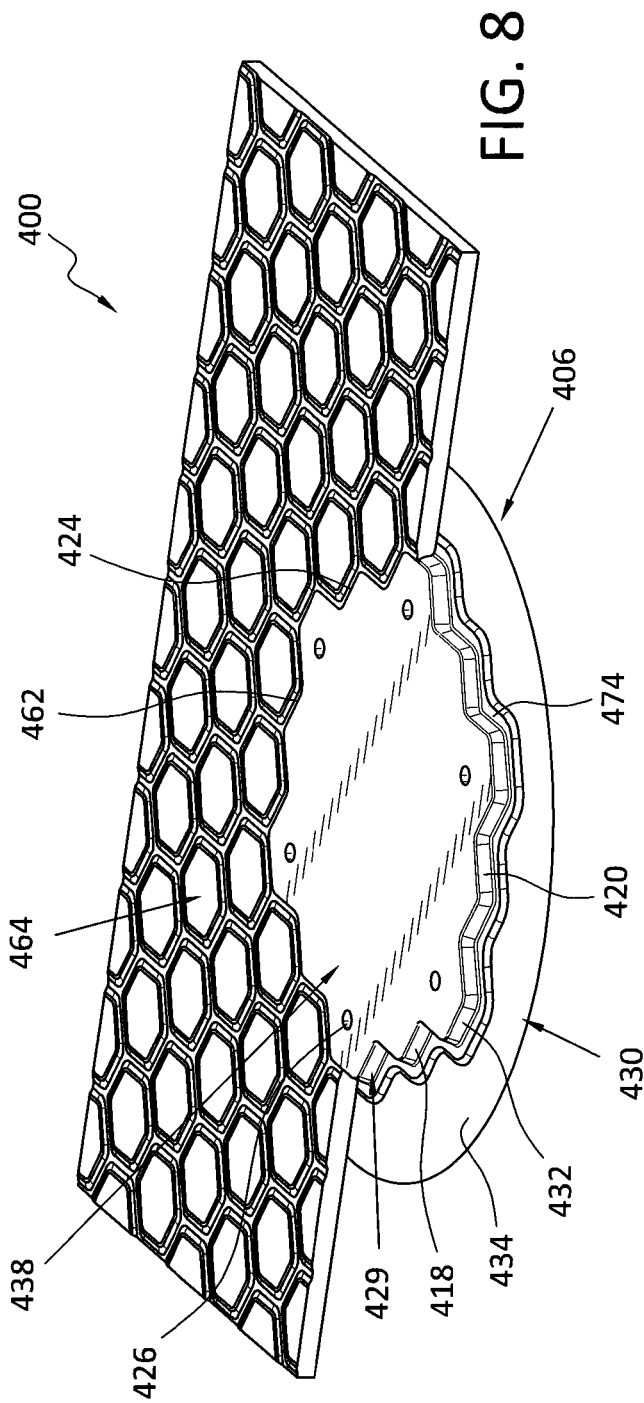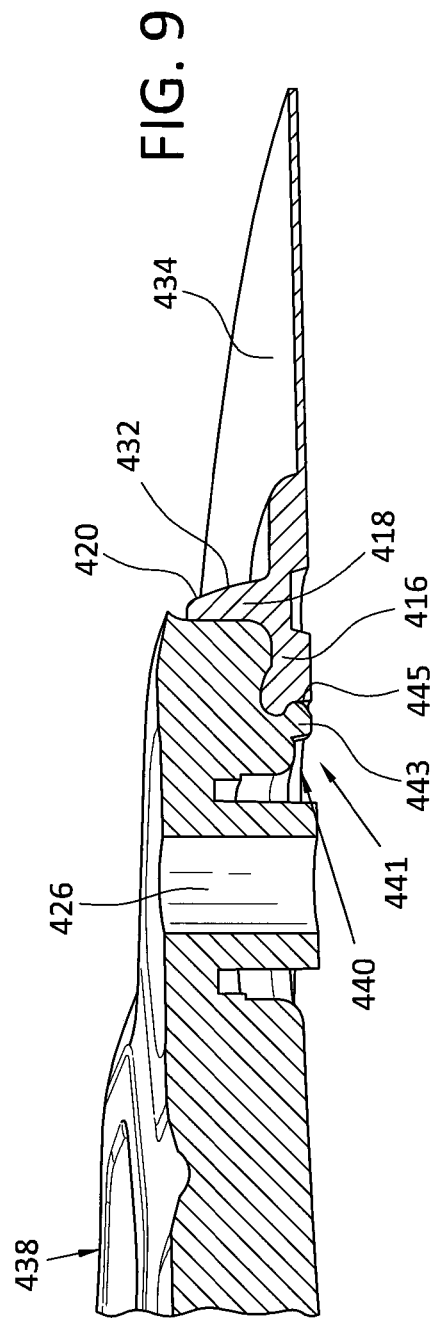

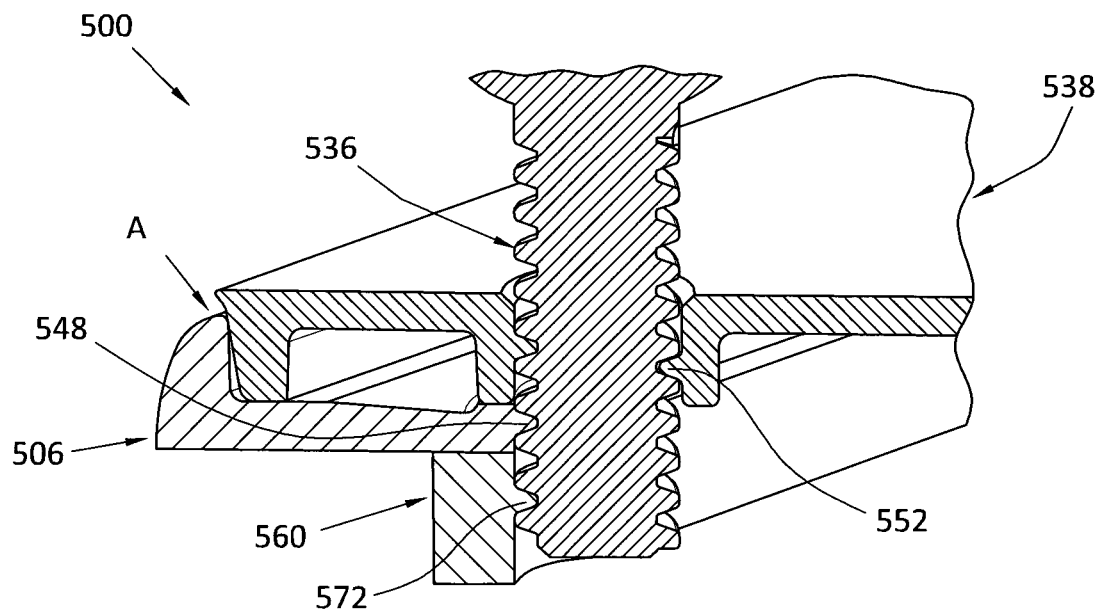
FIG. 19
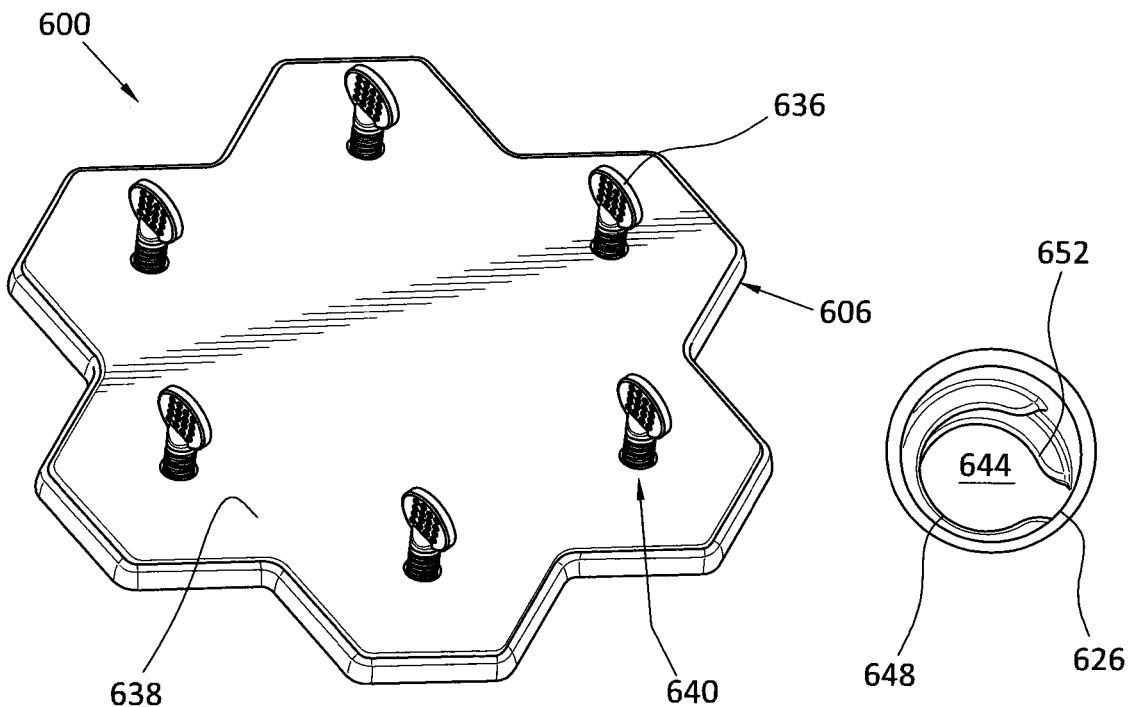
FIG. 20
FIG. 21

DRAIN SYSTEM FOR USE WITH A TILE FLOOR

TECHNICAL FIELD

The disclosure relates to a drain system for installation with a tile floor.

BACKGROUND

Bathrooms, showers, and kitchens are often provided with tiled floors. In showers, a drain is typically placed in or near the center of the shower and the floor is sloped slightly towards the drain to ensure that water runs into the drain. As can be appreciated, tiling a floor that slopes in different directions towards the drain can be difficult and time consuming especially if localized reversed slopes and other slope anomalies are to be avoided. Moreover, tiling a floor can be even more challenging when the tiles approaching the drain are irregularly shaped, requiring excessive cutting or shifting of the tiles. Challenges also arise when the drain is an existing drain that must be replaced, height adjusted, or referenced as a benchmark to match the new tile surface.

For instance, traditional shower drain systems have a drain head or riser connecting to a lower drain via a threaded connection such that to make fine height adjustments one must rotate the drain head relative to the lower drain. This generally does not work well when the drain head is square or non-circular because surrounding tiles in a tile installation can prevent rotation. As such, fine height adjustments of square and non-circular drain heads have been required to be made before tiling around the drain head, and no vertical adjustment can be made when mortar and tile surround the drain head as they prevent rotation. In addition, the drain head is typically on the jobsite when the tile installer arrives and is often not located in an optimal position within the shower floor area. It also is often not installed vertical or plumb. Because the tile installer normally does not want to do plumbing, the tile installer is resigned to working around the poorly positioned drain head, and the threaded connection between the drain head and the lower drain often prevents the drain head from be corrected to plumb.

By way of another example, after a square drain head is raised to the needed height, the tile installer normally uses his or her best effort to make sure the drain head is aligned or square to a dominate wall before packing mortar around the drain head to immobilize it. The tile installer then does a tile layout where the he or she plans the layout of tile, such as mosaic tile, that will surround the drain head. During the subsequent tile installation, a relatively small drain cover fitted on the immobilized, square drain head often proves not to align with the surrounding mosaic tile as the tile installer desired or hoped for, frustrating the tile installer and disrupting the aesthetics of the installed mosaic tile floor.

Some drain systems have attempted to incorporate adjustable features to better align the drain head with surrounding tile. However, such drain systems have connections between the drain head and the lower drain that are known to be unstable and offer inadequate adjustability.

Accordingly, there is a need for a drain system that incorporates certain design improvements over other systems for streamlined and improved installation in a tile floor.

SUMMARY

Embodiments of the present disclosure advantageously provide drain systems that incorporate design improvements over other systems for streamlined and improved installation. The drain system embodiments can further be used with a wide variety of drain products, including retrofit and new installations.

According to an embodiment, a drain system includes a support frame installable in a tile floor. The support frame includes a base portion and a wall portion that forms a seat for a drain cover within the support frame. The wall portion defines a cover-facing surface arranged to interface with the drain cover, and a tile-facing surface arranged to face one or more tiles surrounding the support frame. One or more material locking features are on the tile facing surface to help retain grout between the support frame and the surrounding tiles.

During installation of the support frame in the tile floor, the vertical position of the support frame over the drain opening is adjustable and the support frame does not extend downwardly into the drain opening such that the support frame is floatable over the drain opening for lateral and rotational adjustment of the support frame relative to the drain opening. This floating configuration of the support frame is advantageous because it allows the support frame to be aligned or squared to a dominate wall or other benchmark, such as surrounding tiles, up until when the adjacent tiles are installed around the support frame during a tile installation, streamlining installation and improving the aesthetics of the tile floor.

The floating configuration of the support frame can also allow the drain system to be compatible with different drain components and projects. For instance, the support frame can be used in a retrofit application. If a drain installation includes a floor that is already title, an installer can simply apply a bonding agent to the support frame and selectively position the support cover the existing drain opening and then tile over the existing tile floor up to the support frame. This substantially decreases the time required to install the drain system when compared to prior art drain systems that require demolition and/or complicated tie ins to an existing drain fixture below the existing tile floor.

According to a variation, the vertical position and/or pitch of the support frame is adjustable relative to an underlying drain fixture. For instance, the drain system can include a plurality of set screws that can be selectively manipulated to adjust the position of the support frame relative to the underlying drain fixture. This beneficially can help ensure that the height and/or angle of the support frame better matches that of surrounding tiles at the junction between the support frame and the tiles, improving the look and function of the drain system. Moreover, the height of the support frame can be adjusted without having to rotate the support frame or a drain head as required in the prior art. The set screws also can provide stability at the level the set screws are set to until mortar solidifies around the support frame.

According to a variation, the drain cover comprises a construction plug, and the drain system includes a locking system that selectively locks the construction plug and the support frame together. This allows the construction plug and the support frame to move together when the construction plug is coupled to the support frame, which also can advantageously allow for adjustment of the vertical position, height, and/or angle of the support frame relative to the upper surface of an underlying drain fixture or other underlying surface during a tile floor installation. It also helps prevent unintentional removal of the construction plug from the support frame during an installation, increasing protection of the underlying drain fixture.

BRIEF DESCRIPTION OF THE DRAWINGS

These and other features, aspects, and advantages of the present disclosure will become better understood regarding the following description, appended claims, and accompanying drawings.

FIG. 3A is a side cross section view of a support frame according to an embodiment.

FIGS. 4A-4C show different top views of the drain system in FIG. 1 with the support frame in different positions on the drain fixture.

FIG. 8 is a top perspective view of a tiling system including a drain system and a drain cover comprising a construction plug according to an embodiment.

FIG. 9 is a side cross section view of the drain system in FIG. 8.

FIG. 19 is another cross-section view of the drain system in FIG. 10

FIG. 20 is a top perspective view of a drain system according to another embodiment.

FIG. 21 is a detailed top view of the drain cover in FIG. 20.

Figure 1:
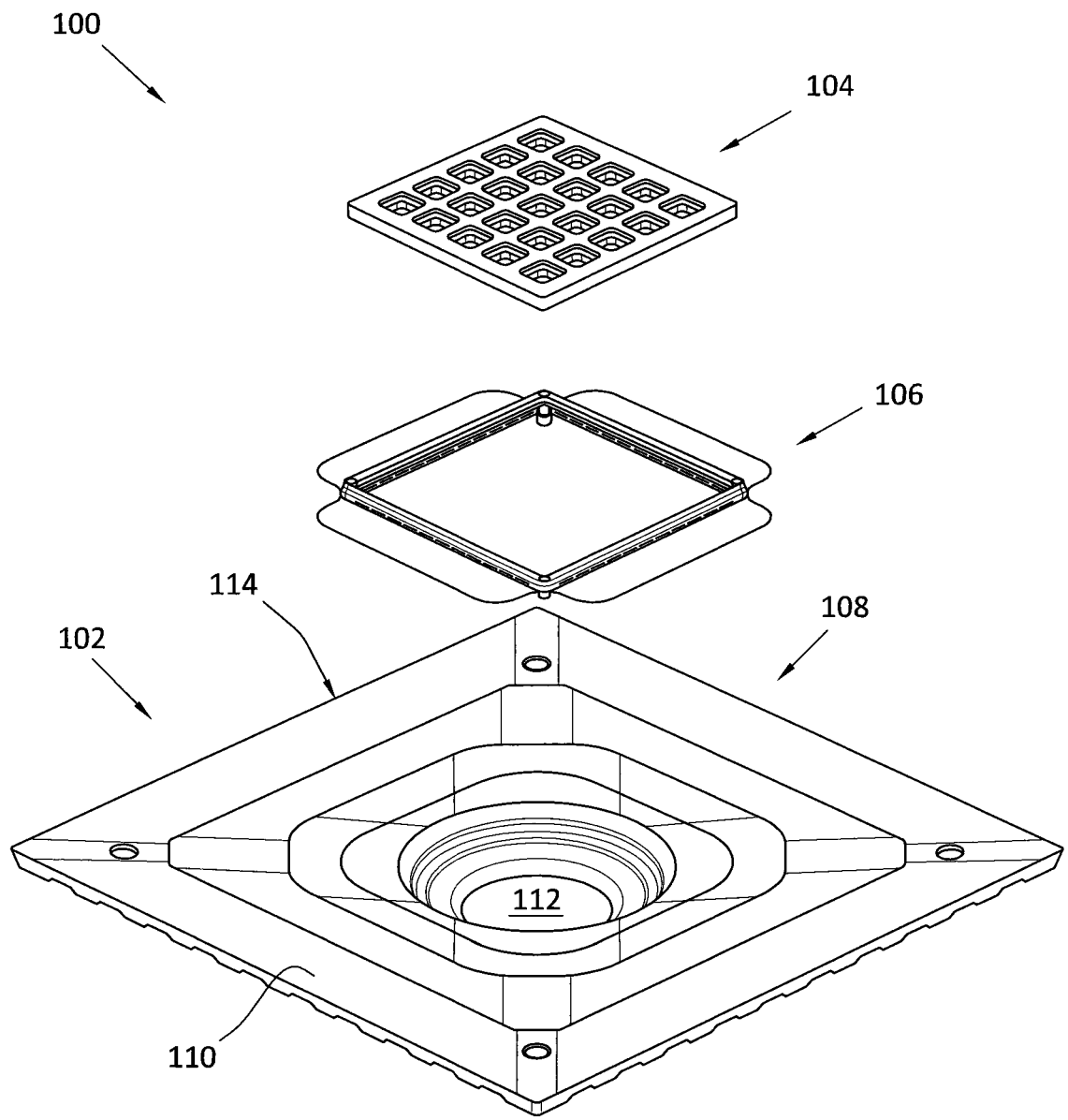
FIG. 1 is a side perspective view of a drain system including a support frame according to an embodiment.

The drawing figures are not necessarily drawn to scale, but instead are drawn to provide a better understanding of the components, and are not intended to be limiting in scope, but to provide exemplary illustrations. The figures illustrate exemplary configurations of drain systems, and in no way limit the structures or configurations of a drain system and components according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Embodiments of the present disclosure advantageously provide drain systems that incorporate certain design improvements over other systems for streamlined and improved installation. The drain system embodiments can be easily height adjusted without having to rotate a riser or drain head as in the prior art. The drain system embodiments can also be aligned or squared with a dominate wall or other benchmark such as surrounding tiles up until when tiles are installed adjacent a support frame of the drain system during a tile installation. The drain system embodiments can further be used with a wide variety of drain products, including retrofit and new installations.

FIG. 1 illustrates a drain system 100 according to an embodiment including a drain fixture 102, a drain cover 104, and a support frame 106 configured to support and position the drain cover 104 on the drain fixture 102 during and after the installation of one or more tiles adjacent to the support frame 106. In the illustrated embodiment, the drain cover 104 can comprise a drain grate having a perforated configuration defining openings that allow water to drain through the drain cover 104 into a drain opening 112 below.

The drain fixture 102 is shown comprising a body 108 including an upper surface 110 defining a drain opening 112 and a lateral flange 114 surrounding the drain opening 112, but in other embodiments the drain fixture 102 can comprise any suitable drain component on which the support frame 106 can be positioned as described below. For instance, the drain fixture 102 can comprise a round tile-in shower drain, an existing drain body in a tile floor, a square or round drain riser, or any other suitable drain component. The drain fixture 102 can be made of metal, plastic, ceramic, combinations thereof, or any other suitable material. As described below, the configuration of the support frame 106 allows it to be retrofitted with existing drain fixtures or different shaped drain fixtures to simplify and improve the installation of a tile floor surrounding the support frame 106.

Figure 2:
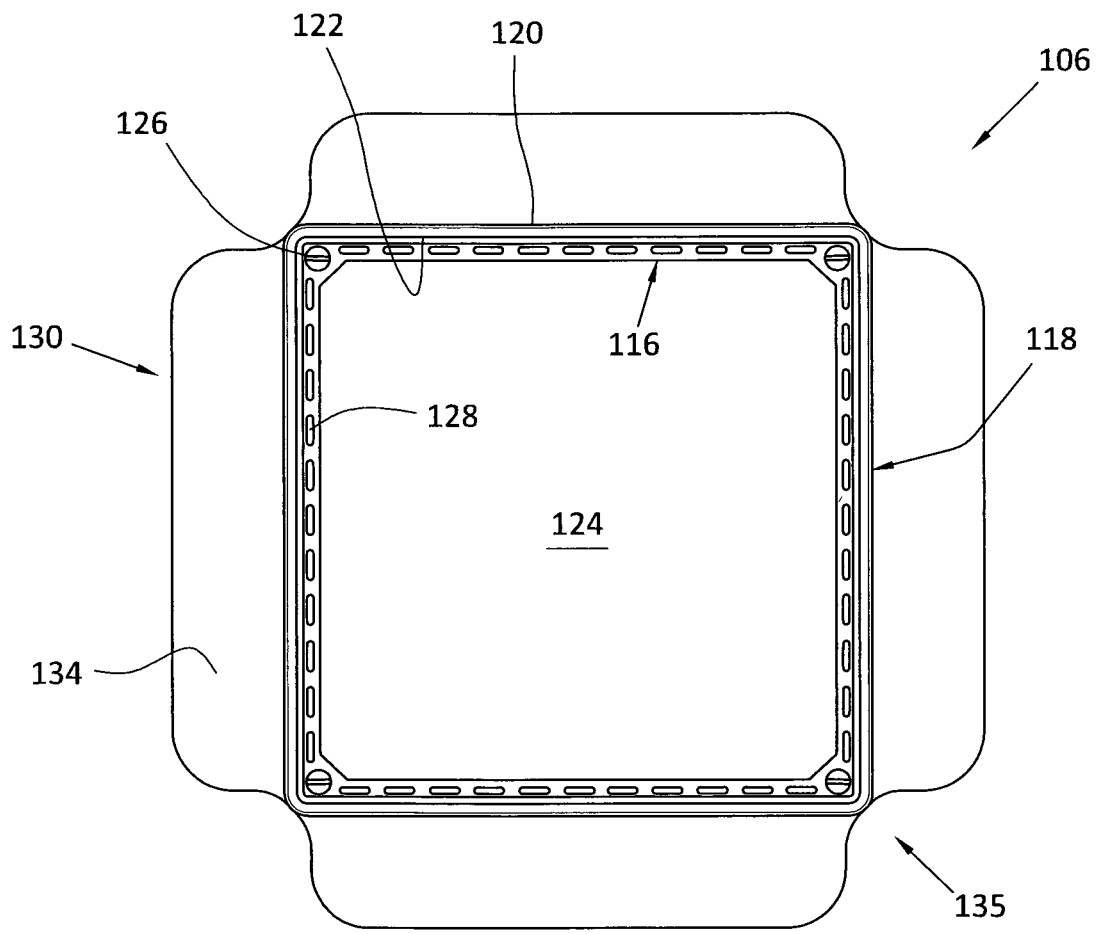
FIG. 2 is a top view of the support frame of FIG. 1.
Figure 3:
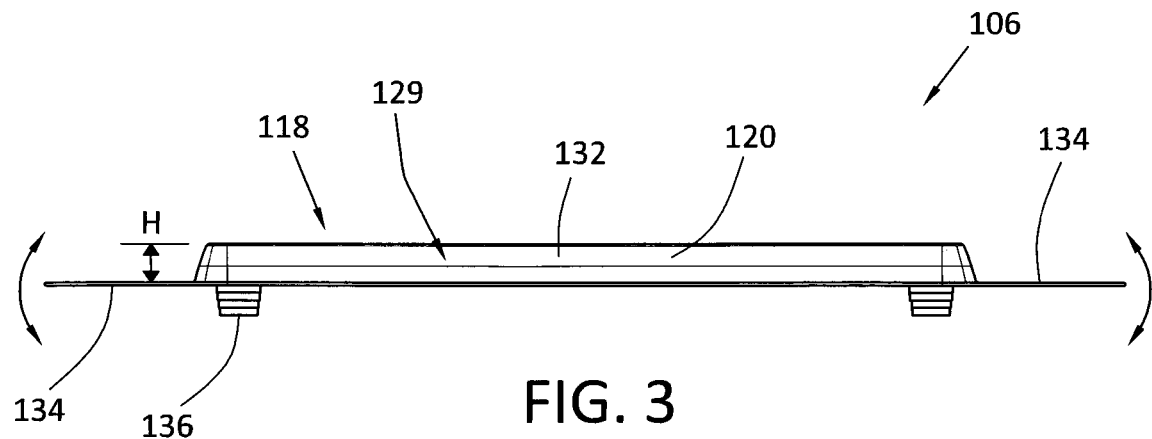
FIG. 3 is a side view of the support frame of FIG. 1.

Referring to FIGS. 2 and 3, the support frame 106 includes a base portion 116 and a wall portion 118 projecting upwardly from the base portion 116. The wall portion 118 defines a tile-facing surface 120 arranged to face adjacent tiles, and a cover-facing surface 122 opposing the tile-facing surface 120 and arranged to interface with the drain cover 104. The base portion 116 extends radially inward from a lower end of the wall portion 118 and defines an opening 124 in communication with the drain opening 112 of the drain fixture 102.

The base portion 116 and the wall portion 118 define a seat for the drain cover 104 with the support frame 106. More particularly, the base portion 116 supports a lower surface of the drain cover 104 above the drain fixture 102, and the cover-facing surface 122 of the wall portion 118 can engage with the outer periphery of the drain cover 104 to restrict or limit lateral movement of the drain cover 104 relative to the support frame 106 when the drain cover 104 is positioned in the support frame 106. The wall portion 118 also provides a physical barrier between the drain cover 104 and the tiles surrounding the drain cover 104. The support frame 106 thus retains and protects the drain cover 104 within a tile floor.

According to an embodiment, the base portion 116 defines a plurality of threaded holes 126. The threaded holes 126 can be in corner areas or areas where two or more sides of the base portion 116 meet, and are configured to receive one or more set screws described below for adjusting the vertical position or height and/or angle of the support frame 106 relative to the drain fixture 102 during a tile installation. This is advantageous because the vertical position of the support frame 106 can be adjusted without having to rotate the support frame 106 or drain head as in the prior art. In addition, the angle of the support frame 106 can be adjusted as desired, such as correcting the support frame 106 to plumb. Moreover, the set screws provide stability at the level they are set to until mortar solidifies Optionally, the base portion 116 can define a plurality of openings or slots 128 configured to allow mortar and/or another material to extend into the slots 128 and provide a mechanical lock between the base portion 116 and a filler material applied below the base portion 116. The slots 128 can have a variety of shapes such as ovals, squares, rectangles and other available shapes that may be formed in the base portion 116, and the slots 128 may be formed in any suitable pattern.

The support frame 106 and the drain cover 104 are shown having generally rectangular shapes. However, the shape and size of the support frame 106 can vary according to the shape and size of the drain cover 104 and/or tiles adjacent to the support frame 106 in a tile floor. For instance, the support frame 106 can comprise a molded plastic member including an outer periphery having a square shape arranged to mate or fit within a square opening defined by a plurality of square tiles surrounding the support frame 106. In other embodiments, the support frame 106 can include an outer periphery having a honeycomb shape arranged to mate or fit within a honeycomb shaped opening defined by a plurality of hexagonal tiles surrounding the support frame 106. In other embodiments, the support frame 106 can have a triangular, rectangular, diamond, irregular shape, combinations thereof, or any other suitable shape. Likewise, the inner periphery of the support frame 106 or the wall portion 118 can generally corresponding to the shape of the drain cover 104. The versatility of the support frame 106 beneficially allow the drain system 100 to work with more tile shapes and drain cover shapes than existing drain systems.

According to a variation, the inner and outer peripheral shapes of the support frame 106 can be different from each other. For instance, the inner periphery of the support frame 106 can have a square shape arranged to mate with a drain cover having a square shape, and the outer periphery of the support frame 106 can have a hexagonal shape arranged to mate or fit within a hexagonal-shaped opening defined by a plurality of hexagonal tiles. The support frame 106 can be formed of a metal material such as aluminum or steel, or of a rigid polymeric or ceramic material. In other embodiments, the support frame 106 can be flexible or semiflexible to provide some tolerance in a fit between the drain cover 104 and/or the surrounding tiles. In other embodiments, the support frame 106 can comprise a molded plastic member.

At least the tile-facing surface 120 of the wall portion 118 can include one or more material locking features 129 configured to help form mechanical or micromechanical bonds between the support frame 106 and tiles surrounding the support frame 106 during installation. This beneficially helps limit separation between the support frame 106 and the surrounding tiles during installation or over time, improving aesthetics of the drain system 100 and conveying water toward the drain opening 112. The one or more material locking features 129 can be integrally formed on at least the tile-facing surface 120, integrally molded onto at least the tile-facing surface 120 or attached thereto in any suitable manner.

In an embodiment, the one or more material locking features 129 comprise at least one fabric layer 130 that extends along the tile-facing surface 120 of the wall portion 118. The connection between the fabric layer 130 and the support frame 106 can be limited to the vertically extending portion of the tile-facing surface 120 of the wall portion 118. The fabric layer 130 can provide a smoother transition between the support frame 106 and adjacent tiles than in existing systems. The fabric layer 130 can also help create mechanical or micromechanical bonds between the support frame 106 and grout and/or other material applied to the fabric layer 130.

According to a variation, the fabric layer 130 can include a first part 132 located on the tile-facing surface 120 of the wall portion 118 and a cover-facing surface 122 may be included as a tileable flap 134 that is movable or foldable relative to a connection between the fabric layer 130 and a bottom of the wall portion 118 or a bottom of the support frame 106. The first part 132 can be integrally molded onto the tile-facing surface 120 or attached in any suitable manner.

The tileable flap 134 can extend or drop below the first part 132. The tileable flap 134 can extend below adjacent tiles and a substrate (e.g., thinset mortar) supporting the tiles, providing enhanced continuity between the support frame 106 and the tiles. The tileable flap 134 can be manufactured or trimmed such that an attachment area between the tileable flap 134 and adjacent tiles can be adjustable or customized as needed. For instance, the tileable flap 134 can have a greater length in a radial direction such that the tileable flap 134 can extend a greater distance below the surrounding substrate and/or tiles.

The tileable flap 134 can extend entirely around the outer periphery of the wall portion 118. In an embodiment, the tileable flap 134 can define a plurality of cutouts 135 at the corner areas or areas where two or more sides of the tileable flap 134 meet. These cutouts 135 permit independent movement of tileable flap 134 along different sides of the wall portion 118 by allowing one side of the tileable flap 134 to fold without folding an adjacent side of the tileable flap 134. In other embodiments, the cutouts 135 can be omitted and the tileable flap 134 can extend continuously around the outer periphery of the wall portion 118. In other embodiments, the tileable flap 134 can extend only partially around the outer periphery of the wall portion 118. In an embodiment, the fabric layer 130 is configured to retain both grout and/or mortar applied thereto.

The fabric layer 130 is preferably a polyester material comprising a non-woven material defining a plurality of open spaces. These open spaces can fill with grout and/or mortar applied to the fabric layer 130 to more securely attach the support frame 106 to tiles installed around the support frame 106.

For instance, as grout is applied to the tile-facing surface 120 during a tile installation project, the grout can penetrate or extend into the open spaces on the first part 132 of the fabric layer 130 to mechanically and/or micromechanically lock the grout with the tile-facing surface 120 of the wall portion 118, which, in turn, helps retain the grout in the gap or space between the wall portion 118 and the tiles installed around the support frame 106. This beneficially helps direct water flowing off the tiles toward the drain cover 104 and improves the aesthetic appearance of the drain system 100. It also helps to retain the tiles and the drain system 100 in a desired configuration.

Likewise, as a substrate such as mortar (e.g. thinset) is applied to the tileable flap 134 of the fabric layer 130 to set tiles around the support frame 106, the mortar can penetrate or extend into the open spaces of the tileable flap 134. As the mortar sets, the mortar within and/or around the tileable flap 134 can mechanically and/or micromechanically bond with the tileable flap 134, which, in turn, helps tie together the support frame 106 and the surrounding tiles and underlying substrate. This beneficially helps limit separation between the support frame 106 and the surrounding tiles during installation and over time, improving aesthetics of the drain system 100. While the fabric layer 130 is described as a non-woven polyester material, in other embodiments, the fabric layer 130 can comprise other materials such as woven materials or other synthetic materials. The fabric layer 130 is preferably made from synthetic fibers to help prevent mold growth in the fabric layer 130. Optionally, the tileable flap 134 can be omitted from the fabric layer 130.

Optionally, the fabric layer 130 can include a weep structure or weeping configuration that allows water or other fluid to pass therethrough. For instance, when water seeps through grout or mortar over the tileable flap 134 of the fabric layer 130, the weep structure of the tileable flap 134 can permit the water to weep through the tileable flap 134 and onto the lateral flange 114 of the drain fixture 102, which, in turn, directs the water toward the drain opening 112.

According to another embodiment shown in FIG. 3A, a layer 115 of sealant such as rubber urethane may be applied below the tileable flap 134 that is impermeable to prevent water from weeping out a lower surface of the tileable flap 134. The tileable flap 134 can include a weeping configuration or weep structure that allows water to pass through the upper surface of the tileable flap 134 and then weep along a length of the tileable flap 134 within a thickness of the fabric layer 130 toward the drain opening 112. According to a variation, a region of the tileable flap 134 toward the wall portion 118 can be open or unsealed such that water can weep out of the tileable flap 134 below the wall portion 118 and flow toward the drain opening 112. It should be appreciated that at least a portion of the fabric layer 130 can have a hydrophilic configuration. For instance, the tileable flap 134 can include matte surfacing to break surface tension of fluids, allowing for a wicking effect. In other embodiments, the tileable flap can include a textured portion defining a hydrophilic surface that attracts and retains moisture in flow channels defined through the fabric layer 130.

According to another variation, at least a lower part of the wall portion 118 can be arranged so that water can weep through the wall portion 118 and flow toward the drain opening 112. For instance, the lower part of the wall portion 118 incorporating the fabric layer 130 can include a weep structure configured to allow water or other fluid to weep through the lower part of the wall portion 118. In other embodiments, the lower part of the wall portion 118 can include a plurality of openings, recesses, or apertures configured to allow water or other fluid to weep through the lower part of the wall portion 118.

Referring again to FIG. 3, the support frame 106 has a height H defined between the bottom and upper surfaces of the support frame 106 that is arranged to be shorter than existing drain systems and thus makes the support frame relatively low-profile compared to existing drain systems. For instance, the height H of the support frame 106 can generally correspond to the thickness of a tile and/or the thickness of the tile plus a substrate material attaching the tile to a base.

In addition, the support frame 106 is configured to not extend downwardly into the drain opening 112 such that a tile installer can float or freely move the support frame 106 over the top of the drain opening 112 on the upper surface 110 of the drain fixture 102 as installation requires. This floating configuration of the support frame 106 over the drain opening 112 allows for lateral adjustment and rotational adjustment of the support frame 106 relative to the drain opening 112 for optimized fit and decreased complexity of installation. For instance, the support frame 106 can be aligned or squared to a dominate wall or surrounding tiles up until when the nearest tiles are installed adjacent the support frame, streamlining installation and improving the aesthetics of the finished tile floor. This is advantageous over prior art drain systems including a square riser or drain head that must be squared to a dominate wall and immobilized prior to the actual tile installation, often resulting in undesired and unpleasant misalignments between a drain cover of the drain system and installed tiles, and precluding the ability to correct such misalignments.

As illustrated with FIGS. 4A-4C, the floating configuration of the support frame 106 allows for a degree of misalignment between the opening 124 of the support frame 106 and the drain opening 112 in various positions, which, in turn, allows the support frame 106 to accommodate different conditions that may present themselves during a tile installation. For instance, the position of the support frame 106 over the drain opening 112 can be moved between a first position shown in FIG. 4A, a second position shown in FIG. 4B, and a third position shown in FIG. 4C. This beneficially allows the position of the support frame 106 over the drain opening 112 to be adjusted as needed such as required due to the presence of a wall extending over the drain fixture 102, and/or to accommodate tile anomalies or other undesirable conditions.

The floating configuration of the support frame 106 also allows the support frame 106 to be compatible with several different drain components. For instance, the support frame 106 can be used in a retrofit application. If a drain installation includes a floor that is already tiled, an installer can simply apply a bonding agent to the support frame 106 and selectively position the support frame 106 over the existing drain opening and then tile right over the existing tile floor up to the support frame 106. This substantially decreases the time required to install the drain system when compared to other drain systems that require demolition and/or complicated tie ins to an existing drain fixture below the existing tile floor.

Figure 5:
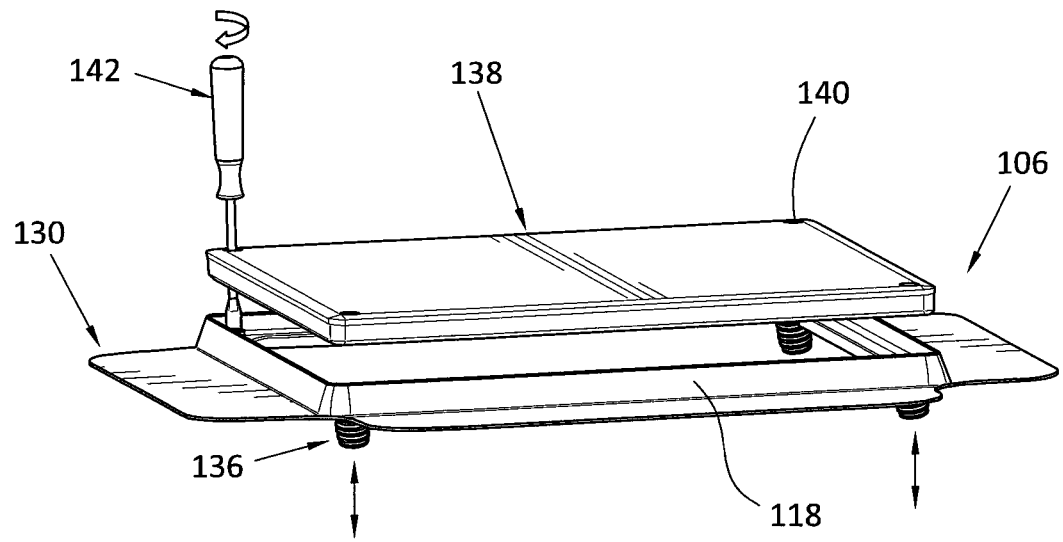
FIG. 5 is a top perspective view of the support frame of FIG. 1 and a construction plug according to an embodiment.

Referring now to FIG. 5, the support frame 106 can be adjustable in vertical position and/or pitch or angle relative to the drain fixture 102. This beneficially helps ensure that the height and/or angle of the support frame 106 better matches that of surrounding tiles at the junction between the support frame 106 and the tiles, improving the look and function of the drain system 100. For instance, the threaded holes 126 in the base portion 116 can receive one or more set screws 136 having lower ends arranged to engage the upper surface 110 of the drain fixture 102. The set screws 136 can be arranged to support on, but do not attach the support frame 106 to, the drain fixture 102. The set screws 136 are sufficiently rigid such that they at least in part support the support frame 106 on the drain fixture 102 outside of the drain opening 112. They can thus provide stability at the level they are set to until mortar surrounding the support frame 106 solidifies.

The set screws 136 can be rotated in the threaded holes 126 to raise and/or lower the support frame 106 relative to the upper surface 110 of the drain fixture 102. FIG. 5 illustrates an exemplary system for adjusting the vertical position and/or angle of the support frame 106 on the upper surface 110 of the drain fixture 102. The drain cover 104 is interchangeable with another drain cover comprising a construction plug 138 positionable in the opening 124 of the support frame 106 during a tile floor installation. The construction plug 138 can be temporary and have an upper surface having a solid or continuous or substantially continuous configuration arranged to prevent mortar and other debris from entering the drain opening 112 when the construction plug 138 is positioned on the support frame 106.

The construction plug 138 also can reinforce the wall portion 118 against radially inward movement when the construction plug 138 is positioned on the support frame 106. This has the effect of helping to prevent the wall portion 118 of the support frame 106 from being deformed by tiles forcing themselves against the tile-facing surface 120 of the wall portion 118 during an installation. The construction plug 138 can thus help the support frame 106 maintain its shape to properly receive the drain cover 104 (e.g. a drain grate) after a tile installation is complete.

In the illustrated embodiment, the construction plug 138 includes a plurality of access holes 140 corresponding to the threaded holes 126 in the base portion 116. This beneficially allows the set screws 136 to be accessed through the construction plug 138 when the construction plug 138 is positioned in the support frame 106.

With the construction plug 138 installed in the support frame 106, a small amount of mortar can be applied over the tileable flap 134 of the fabric layer 130. A leveler can then be positioned on top of the support frame 106 to determine how level the support frame 106 is relative to horizontal. The upper surface of the construction plug 138 is arranged to be flush or substantially flush with the upper surface of the wall portion 118 when the construction plug 138 is installed on the support frame 106. This allows the upper surface of the construction plug 138 to provide a reference to help determine when the support frame 106 is level or at a desired angle.

It will be appreciated that the set screws 136 can include a tool connectable portion adapted to receive a screwdriver 142 or other tool to rotate the set screws 136 or resist rotation as needed. An installer can selectively insert the screwdriver 142 through the access holes 140 in the construction plug 138 to access and rotate the set screws 136 as needed to level the support frame 106 relative to horizontal before the mortar on the tileable flap 134 sets. Once the mortar is set, the construction plug 138 can be removed and any space defined between the bottom of the base portion 116 and the bottom of the set screws 136 can be filled with grout and/or another material to reinforce the base portion 116 against collapsing or bending during use, such as when a person steps on the drain cover 104.

In other embodiments, the set screws 136 can be selectively rotated in the threaded holes 126 to adjust the vertical position or height of the support frame 106 relative to the upper surface 110 of the drain fixture 102 based on a thickness of specific tiles surrounding the support frame 106. For instance, if the tiles surrounding the support frame 106 have a thickness of ¼ inch, the set screws 136 can be manipulated to adjust the vertical position or height of the upper surface of the wall portion 118 of the support frame 106 to match or correspond to that of the tiles. As the height of the support frame 106 is adjusted, the tileable flap 134 of the fabric layer 130 can drop or hang down to the underlying surface, bridging a distance between the support frame 106 and the underlying surface.

The low-profile bondable configuration of the support frame 106 can allow the drain system 100 to be easily positioned relative to an existing drain, a new drain, a floor, a wall, or any other position that installation requires.

In one exemplary installation process related to installing the drain system 100 in a tiled floor, the drain fixture 102 can be placed in position relative to an underlying base. In placing the drain fixture 102, the drain opening 112 can be attached to a drainpipe or other underdrain structure, and the support frame 106 carrying the construction plug 138 can be positioned over the drain opening 112. Formwork is placed and secured to the underlying base.

Once the drain fixture 102 is placed, a mortar material can then be applied to the underlying base to form a mortar bed up to the upper surface 110 of the drain fixture 102, forming the appropriate slope towards the drain opening 112. It will be appreciated that a mortar bed is exemplary only, and other possible beds exists. Optionally, a shower pan can be placed between the mortar bed and the underlying base.

Thinset mortar can be spread over the top of the mortar bed and the tileable flap 134 of the fabric layer 130, and floor tiles can be set in the thinset mortar. The thinset mortar can be applied such that a small gap remains between the support frame 106 and the thinset mortar. As discussed above, openings in the structure of the fabric layer 130 beneficially allow the thinset mortar to form a mechanical or micromechanical lock with the tileable flap 134, tying the support frame 106 and the thinset mortar together. As the thinset mortar dries, the vertical position and/or angle of the support frame 106 can be adjusted via the access holes 140 formed in the construction plug 138, if needed, such that the set tiles are flush or substantially flush with the upper surface of the construction plug 138. In addition, the lateral and/or rotational position of the support frame 106 can be adjusted relative to the set tiles as needed to create a smoother transition between the tiles and the support frame 106.

Once the thinset mortar is dried, the set tiles can be grouted with the construction plug 138 in place. As discussed above, openings in the structure of the fabric layer 130 allow the grout to form a mechanical or micromechanical lock to the first part 132 of the fabric layer 130. This has the effect of enhancing retention of the grout between the support frame 106 and the surrounding tiles, helping to convey water toward the drain opening 112, and helping to retain the drain system 100, the support frame 106, and the tiles in their desired configuration.

After grouting, the construction plug 138 can be removed and a filler material such as grout, mortar, and/or other material can be applied below the base portion 116 to help reinforce the support frame 106 against collapsing or bending during use, such as when a person steps on the drain cover 104. As discussed above, the slots 128 can help the filler material lock with the base portion 116. In addition, the filler material can bond with the tileable flap 134, helping to keep the filler material in place below the base portion 116. After the filler material has dried, the installer can position the drain cover 104 in the support frame 106 and the drain system 100 is ready for use. The drain cover 104 and the construction plug 138 are sized and configured so that when the construction plug 138 is removed and the drain cover is installed in the support frame 106, the upper surfaces of the drain cover 104 and the set tiles are substantially flush or flush with one another, enhancing the aesthetics and hydraulic properties of the drain system 100.

The drain system 100 can thus allow for easier and faster installation of tile floors that are more appealing than existing systems and which exhibit improved hydraulic properties. In other embodiments, the drain system 100 can be positioned over an existing drain in a tiled floor and new tiles can be installed over the existing tiles such that new tiles when set are flush or substantially flush with the upper surface of the construction plug 138. As such, when the construction plug is removed and the drain cover 104 is installed in the support frame 106, the upper surfaces of the drain cover 104 and the new tiles are substantially flush or flush with one another.

Figure 6:
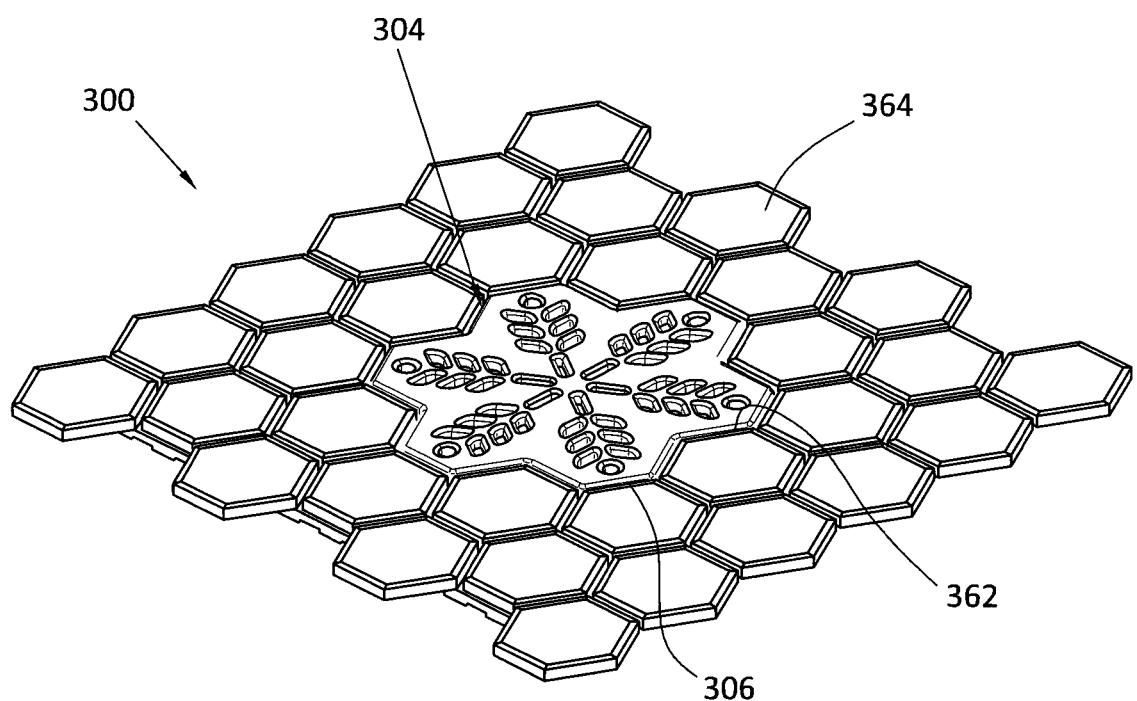
FIG. 6 is a top perspective view of a tiling system including a drain system and a drain cover according to another embodiment.
Figure 7:
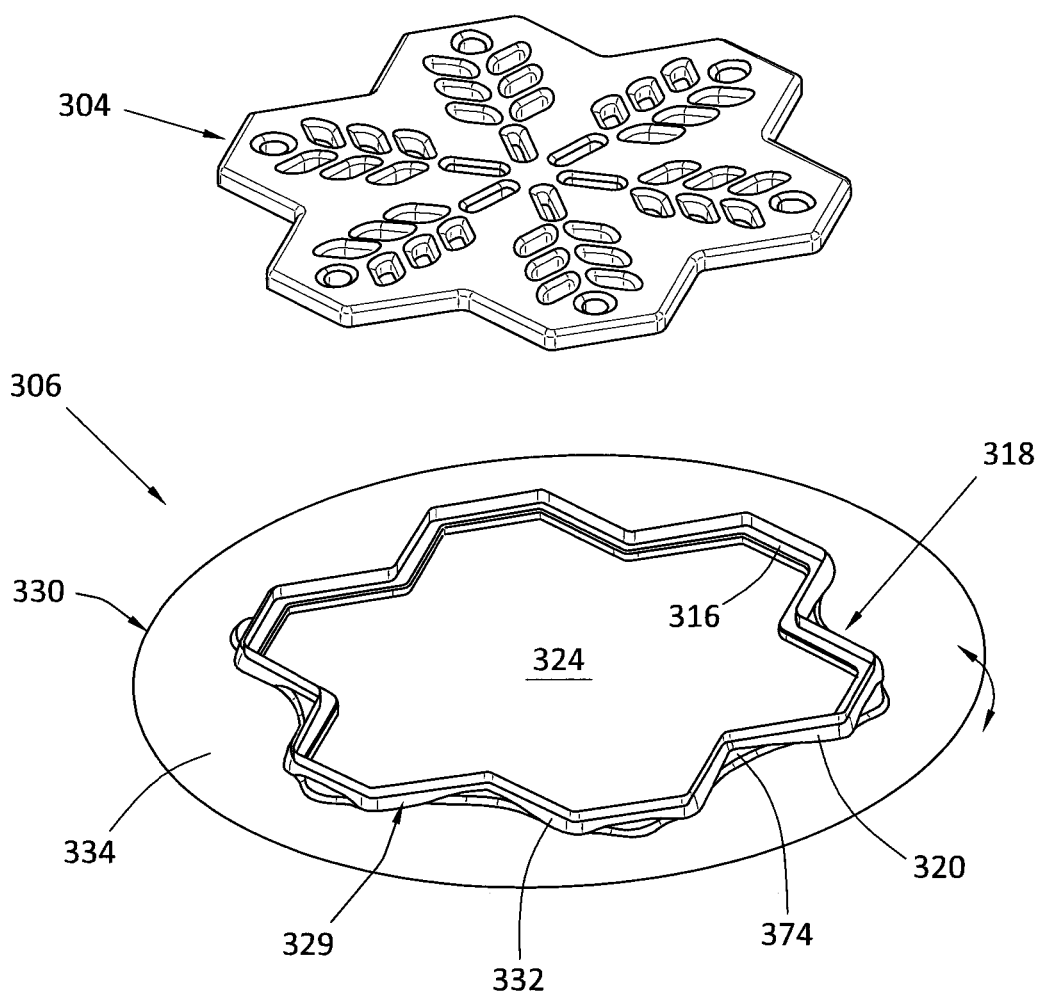
FIG. 7 is a top exploded view of the support frame and the drain cover in FIG. 6 according to an embodiment.
Figure 10:
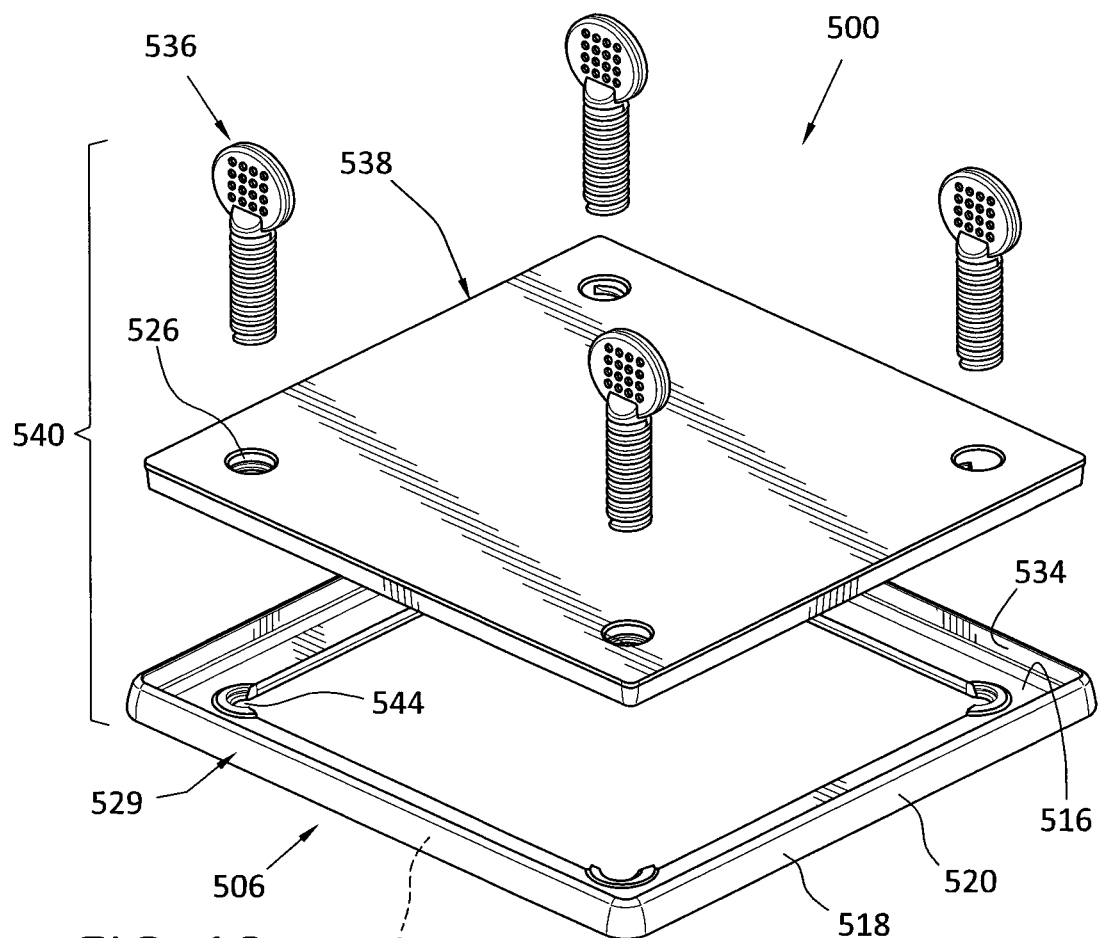
FIG. 10 is an exploded view of a drain system according to another embodiment.
Figure 11:
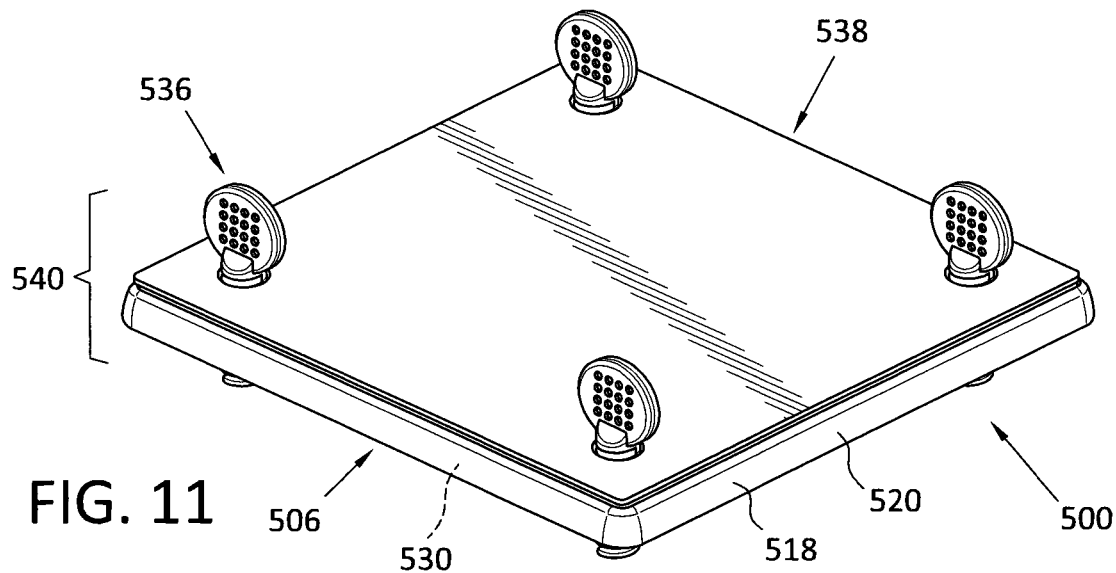
FIG. 11 is a side perspective view of the drain system in FIG. 10.

FIGS. 6 and 7 illustrated yet another embodiment of a drain system 300 including a drain cover 304 and a support frame 306. It will be appreciated that the drain system 300 can include the same or similar features as the other embodiments described herein. For instance, the drain cover 304 can comprise a drain grate that is perforated to allow for water to drain therethrough. Like other embodiments, it will be appreciated that the drain cover 304 can be interchangeable with a construction plug arranged for use during a tile floor installation.

The support frame 306 comprises a molded plastic member having a hexagonal shape arranged to fit or mate within a hexagonal opening 362 defined by a plurality of hexagonal tiles 364 surrounding the support frame 306. This allows the drain system 300 to be substantially seamlessly or seamlessly installed in a hexagonal pattern tile floor without having to cut the tiles to fit against the drain as in existing systems. The inner peripheral shape of the support frame 306 can also have a hexagonal shape arranged to receive the drain cover 304 having a corresponding hexagonal shape. While the support frame 306 is described having similar inner and outer peripheral shapes, in other embodiments, the support frame 306 can have an outer peripheral shape that is different than its inner peripheral shape. In other embodiments, the support frame 306 can be formed of metal or any other suitable material.

Like in other embodiments, the support frame 306 includes a base portion 316 and a wall portion 318 projecting upwardly from the base portion 316. The base portion 316 extends radially inward from a lower end portion of the wall portion 318 and defines an opening 324 in communication with a drain opening of a drain fixture. The base portion 316 and the wall portion 318 define a seat for the drain cover 304 within the support frame 306 such that the support frame 306 can support and position the drain cover 304 within a tile floor.

As in previous embodiments, the support frame 306 includes one or more material locking features 329 comprising at least one fabric layer 330 extends along a tile-facing surface 320 of the wall portion 318. The direct connection between the fabric layer 330 and the support frame 306 can be limited to a vertically extending portion of the tile-facing surface 320 of the wall portion 318. The fabric layer 330 provides continuity between the support frame 306 and adjacent tiles. The fabric layer 330 also creates mechanical or micromechanical bonds between the support frame 306 and grout, or other material applied to the fabric layer 330. This beneficially helps limit separation between the support frame 306 and the surrounding tiles over time, improving aesthetics of the drain system 300 and conveying water toward the drain opening.

The fabric layer 330 includes a first part 332 integrally molded into the tile-facing surface 320 of the wall portion 318, and a tileable flap 334 that is movable or foldable relative to a connection between the fabric layer 330 and a bottom of the support frame 306. The tileable flap 334 can extend entirely or partially around the outer periphery of the wall portion 318. The tileable flap 334 has a circular shape in the illustrated embodiment but can have any suitable shape.

In the illustrated embodiment, the outer periphery of the support frame 306 includes one or more web portions 374 extending between angles formed in the wall portion 318. These web portions 374 can be sized and configured to level or align top surfaces of tiles adjacent to the support frame 306 with the top of the support frame 306. For instance, a height of the wall portion 318 between the top of the support frame 306 and the top of the web portions 374 can be tied to thicknesses of specific tiles such that when that tile is positioned on the web portions 374, the top of the tile is substantially flush or flush with the top of the support frame 306.

As such, the support frame 306 can be manufactured to fit different tile thicknesses to enhance the transition between the support frame and adjacent tiles. The support frame 306 and web portions 374, for example, can be manufactured to help level tiles that are about ⅛-inch-thick, about ¼-inch-thick, about ⅜ inch-thick, or about ½ inch thick. In other embodiments, the support frame 306 can be adapted to work with tiles that are thicker or thinner.

FIGS. 8 and 9 illustrates yet another embodiment of a drain system 400 including a support frame 406 configured to support and position a drain cover over a drain opening in a tile floor. It will be appreciated that the drain system 400 can include the same or similar features as the other embodiments described herein. The support frame 406 is shown having a honeycomb shape arranged to fit or mate within a honeycomb shaped opening 462 defined by a plurality of hexagonal tiles 464 surrounding the support frame 406. This allows the drain system 400 to be substantially seamlessly or seamlessly installed in a hexagonal pattern tile floor without having to cut the tiles 464 to fit against the drain as in existing systems. The inner peripheral shape of the support frame 406 can also have a honeycomb shape arranged to receive a drain cover comprising a perforated drain grate or a construction plug 438 having a corresponding shape.

Like the previous embodiments, the support frame 406 includes a base portion 416 and a wall portion 418 projecting upwardly from the base portion 416. The base portion 416 extends radially inward from a lower end portion of the wall portion 418 and defines an opening in communication with a drain opening of a drain fixture. The base portion 416 and the wall portion 418 define a seat for the drain cover within the support frame 406 such that the support frame 406 can support and position the drain cover within a tile floor.

In the illustrated embodiment, a circumferential flange 474 extends radially outward from the wall portion 418. The flange 474 can be sized and configured to level or align the top surface of tiles adjacent to the support frame 406 with the top of the support frame 406. For example, a height of the wall portion 418 between the top of the support frame 406 and the top of the flange 474 can be tied to thicknesses of specific tiles such that when the tile is positioned on the flange 474, the top of the tile is substantially flush or flush with the top of the support frame 406.

Like in other embodiments, at least the tile-facing surface 420 includes one or more material locking features 429 configured to improve a connection between the support frame 406 and surrounding tiles 464. The material locking features 429 can comprise at least one fabric layer 430 extends along a tile-facing surface 420 of the wall portion 418. The direct connection between the fabric layer 430 and the support frame 406 can be limited to a vertically extending portion of the tile-facing surface 420 of the wall portion 418. As in previous embodiments, the fabric layer 430 provides continuity between the support frame 406 and the surrounding tiles 464. The fabric layer 430 also creates mechanical or micromechanical bonds between the support frame 406 and grout, or another material applied to the fabric layer 430. This beneficially helps limit undesirable separation between the support frame 406 and the surrounding tiles over time, and improving aesthetics of the drain system 400.

The fabric layer 430 can include a first part 432 integrally molded into the tile-facing surface 420 of the wall portion 418, and a tileable flap 434 that is movable or foldable relative to a connection between the fabric layer 330 and a bottom of the support frame 406. In other embodiments, the tileable flap 434 can be omitted.

The support frame 406 can be adjustable in vertical position and/or pitch relative to an underlying drain fixture, helping to ensure that the height and/or angle of the support frame 406 better matches that of surrounding tiles 464 at the junction between the support frame 406 and the tiles 464, improving the look and function of the drain system 400. For instance, the construction plug 438 is provided to be positioned in the opening 424 of the support frame 406. The construction plug 438 has an upper surface having a continuous or substantially continuous configuration arranged to prevent mortar and other debris from entering a drain opening of a drain fixture when the construction plug 438 is positioned on the support frame 406.

According to a variation, a locking system 440 selectively locks the construction plug 438 and the support frame 406 together. This allows the construction plug 438 and the support frame 406 to move together when the construction plug 438 is coupled to the support frame 406, which also can advantageously allow for adjustment of the vertical position or the height and/or angle of the support frame 406 relative to an upper surface of an underlying drain fixture or other underlying surface during a tile floor installation.

In an embodiment, the locking system 440 can include one or more snap lock features 441 that reversibly attach the construction plug 438 to the support frame 406 when the construction plug 438 is positioned on the support frame 406. For instance, the snap lock features 441 can comprise a plurality of hook portions 443 defined on the construction plug 438 that interact with a one or more recesses 445 defined on the base portion 416 to hook the construction plug 438 to the support frame 406 at three, four, five, six, or any other number of suitable locations. In other embodiments, the snap lock features 441 can include male features defined by the construction plug 438 and corresponding female features defined by the support frame 406 or vice versa.

To remove the construction plug 438 from the support frame 406, a force can be applied to the construction plug 438 that overcomes the engagement between the snap lock features 441. It will be appreciated that the size, number, and configuration of the snap lock features 441 can be adjusted to vary the strength of the snap fit as needed. The snap lock features 441 are preferably configured so that the force required to remove the construction plug 438 from the support frame 406 is less than the force required to move the support frame 406 when it is set in mortar or other binding material. Therefore, when an installer lifts the construction plug 438 away from the support frame 406, the support frame 406 remains set in the mortar but detaches from the construction plug 438.

In an embodiment, the construction plug 438 can include a plurality of threaded holes 426 configured to receive one or more set screws having lower ends arranged to engage an upper surface of a drain fixture or other underlying surface. The set screws can be arranged to support the support frame 406 and the construction plug 438 on, but not attach them to the drain fixture. The set screws can be rotated in the threaded holes 426 to raise, lower, and/or angle the support frame 406 and the construction plug 438 relative to the upper surface of the drain fixture. The threaded holes 426 are preferably positioned such that the set screws locate radially inside of the base portion 416 or separate from the structure of the support frame 406 when inserted in the threaded holes 426. In other embodiments, the threaded holes 426 can be aligned with corresponding threaded holes in the base portion 416 such that the set screws can both level and attach the support frame 406 and the construction plug 438 together, allowing for the snap-fit between the two components to be adjusted or omitted.

In use, a small amount of mortar can be applied around the support frame 406 with the construction plug 438 installed in the support frame 406. For instance, the mortar can be applied over the tileable flap 434 of the fabric layer 430. A leveler can then be positioned on top of the support frame 406 to determine how level the support frame 406 is relative to horizontal. An installer can then insert a screwdriver or other tool through the through the threaded holes 426 in the construction plug 438 to access and selectively rotate one or more of the set screws to level and/or adjust the height of the support frame 406 as needed before the mortar surrounding the support frame 406 is set.

Once the mortar is set, the set tiles 464 can be grouted with the construction plug 438 in place. As discussed above, openings in the structure of the fabric layer 430 allow the grout to form a mechanical or micromechanical lock to the fabric layer 430. This has the effect of better retaining the grout between the support frame 406 and the surrounding tiles 464, helping to direct water flow off the tiles toward a drain cover, and helping to retain the drain system 400, the support frame 406, and the tiles in their desired configuration.

After grouting, the construction plug 438 can be removed. To remove the construction plug 438, a separating force can be applied to the construction plug 438 to break the snap-fit between the construction plug 438 and the support frame 406 now set in the mortar, which, in turn, allows the construction plug 438 and the set screws to be removed from the support frame 406. Optionally, a filler material such as grout, mortar, and/or other material can then be applied below the base portion 416 to help reinforce the support frame 406 against collapsing or bending during use, such as when the drain cover is loaded (e.g., a person steps on the drain cover).

The installer can then position a drain cover having a perforated configuration in the support frame 406 and the drain system 400 is ready for use. The drain cover and the construction plug 438 can be sized and configured so that when the construction plug 438 is removed and the drain cover is installed in the support frame 406, the upper surfaces of the drain cover and the set tiles are substantially flush or flush with one another, enhancing the aesthetics and hydraulic properties of the drain system 400. The drain system 400 can thus allow for easier and faster installation of tile floors that are more appealing than existing systems and which exhibit improved hydraulic properties.

While the locking system 440 is described as a snap-lock system with hook members, it will be appreciate that in other embodiments the locking system can comprise any suitable coupling means such as an annular snap-fit, a cantilever snap-fit, a torsional snap-fit, a threaded connection, an adhesive attachment, or any other suitable type of reversible attachment.

FIGS. 10-19 illustrate yet another embodiment of a drain system 500 including a support frame 506 configured to support and position a drain cover over a drain opening in a tile floor. It will be appreciated that the drain system 500 can include the same or similar features as other embodiments described herein. The drain cover can be a construction plug 538 (shown in FIGS. 10-14) and/or a drain cover 504 (shown in FIG. 15). Like in other embodiments, the support frame 506 can be floatable over the drain opening for lateral and/or rotational adjustment of the support frame 506 relative to the drain opening. The floating configuration of the support frame 106 allows for optimized fit and decreased complexity of installation. For instance, the support frame 506 can be aligned or squared to a dominate wall or other benchmark such as surrounding tiles up until when tiles are installed adjacent the support frame, streamlining installation and improving the aesthetics of the finished tile floor. This is advantageous over prior art drain systems that require a square riser or drain head of the drain system to be squared to a dominate wall and immobilized prior to the actual tile installation, often resulting in undesired and unpleasant misalignments between the drain system and installed tiles, and precluding the ability to correct such misalignments.

The support frame 506 includes a base portion 516 and a wall portion 518 projecting upwardly from the base portion 516. The base portion 516 extends radially inward from a lower end portion of the wall portion 518 and defines an opening in communication with the drain opening of a drain fixture. The base portion 516 and the wall portion 518 define a seat for the drain cover within the support frame 506 such that the support frame 506 can support and position the drain cover within a tile floor. The wall portion 518 can define a cover-facing surface 534 arranged to interface with the drain cover, and a tile-facing surface 520 arranged to face tiles and/or grouting material surrounding the support frame 506. The support frame 506 can be formed of ABS plastic or any other suitable material. Further, the support frame 506 may be provided in different sizes such as a 4-inch and 5-inch support frame 506.

At least the tile-facing surface 520 includes one or more material locking features 529 configured to enhance a connection between the support frame 506 and surrounding tiles. In an embodiment, the one or more material locking features 529 comprise at least one fabric layer 530 extends along at least part of the tile-facing surface 520. The fabric layer 530 can provide a smooth transition between the support frame 506 and adjacent tiles and can help create mechanical or micromechanical bonds between the support frame 506 and grout, or other material applied to the fabric layer 530. This beneficially helps limit separation between the support frame 506 and the surrounding tiles during installation or over time.

According a variation, the fabric layer 530 can be integrally molded or otherwise attached onto the tile-facing surface 520 and a bottom surface of the base portion 516. For instance, the fabric layer 530 can wrap around from the tile-facing surface 520 onto the bottom surface of the base portion 516. In an embodiment, the fabric layer 530 terminates short of threads or cutouts defined on the base portion 516 as described below. In an embodiment, the fabric layer 530 may be omitted from the upper surface of the base portion 516. In an embodiment, the fabric layer 530 can comprise a Polyethylene (PE) fabric or any other suitable fabric.

The construction plug 538 can have an upper surface having a continuous or substantially continuous configuration arranged to prevent mortar and other debris from entering the drain opening when the construction plug 538 is positioned on the support frame 506. The construction plug 538 also can reinforce the wall portion 518 against radially inward movement when the construction plug 538 is positioned on the support frame 506. This has the effect of helping to prevent the wall portion 518 of the support frame 506 from being deformed by tiles forcing themselves against the tile-facing surface 520 of the wall portion 518 during an installation. The construction plug 538 can thus help the support frame 506 maintain its shape to properly receive the drain cover (e.g. a drain grate) after a tile installation is complete.

Like the previous embodiment, a locking system 540 can selectively and temporarily lock the construction plug 538 and the support frame 506 together. This helps prevent unintentional removal of the construction plug 538 from the support frame 506 during an installation, increasing protection of the underlying drain fixture. It also allows the construction plug 538 and the support frame 506 to move together when the construction plug 538 is coupled to the support frame 506, which also can advantageously allow for adjustment of a vertical position or height and/or angle of the support frame 506 relative to an upper surface 510 of an underlying drain fixture 502 or other underlying surface during a tile floor installation.

In the illustrated embodiment, the locking system 540 includes a plurality of fasteners or set screws 536, a first plurality of openings 526 defined in the construction plug 538, and a second plurality of openings 544 defined in the base portion 516. The first openings 526 in the construction plug 538 align with the second openings 544 in the base portion 516 when the construction plug 538 is positioned on the support frame 506. The set screws 536 have lower ends arranged to engage an upper surface of a drain fixture 502 (shown in FIG. 14) or another underlying surface. The set screws 536 are shown including enlarged, flattened head portions arranged to facilitate manual rotation but can include any suitable head configuration.

Figure 12:
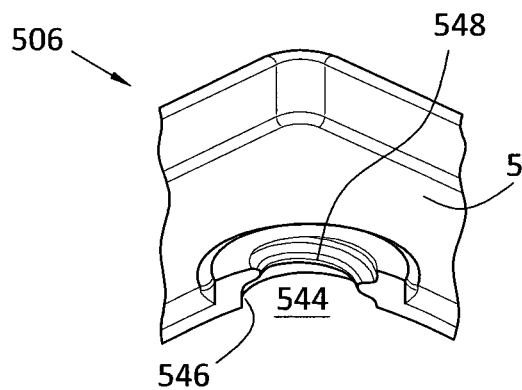
FIG. 12 is a perspective detailed view of the support frame in FIG. 10.
Figure 13:
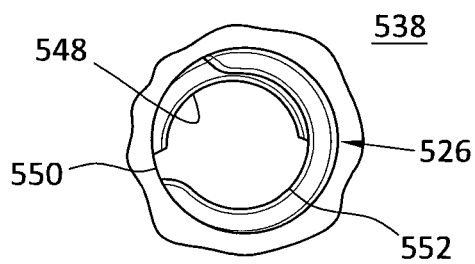
FIG. 13 is a top detailed view of the drain cover in FIG. 10.

Referring to FIG. 12, the second openings 544 can comprise cutouts 546 in corner areas or areas where two or more sides of the support frame 506 meet. Each cutout 546 forms an arcuate or incomplete circular shape and defines at least one thread 548 having a partial configuration arranged to mesh with the threads on the set screws 536. The at least one thread 548 can include one, two, or any suitable number of threads. Referring to FIG. 13, the first openings 526 can comprise through holes 550 formed in corner areas or areas where two or more sides of the construction plug 538 come together. Each through hole 550 has a circular cross section and defines at least one thread 552 having a partial circumferential configuration arranged to threadedly engage the set screws 536. The at least one thread 552 can comprise one, two, three, or any other suitable number of threads.

The threads 552 are also be arranged to cooperate with the threads 548 on the base portion 516 such that the support frame 506 and construction plug 538 are held together as the set screw 536 is threaded into and out of the first and second openings 526, 544. In an embodiment, the threads 548, 552 can have a common thread geometry and clocking to help ensure proper alignment and function regardless of the support frame 506 and the construction plug 538 being randomly rotated and assembled.

As seen in FIG. 13, the threads 552 can be circumferentially and vertically offset relative to the threads 548 in the second openings 544. This can help locate both threads on a same thread or helical path configured to mesh with the set screws 536 and lock the support frame 506 and the construction plug 538 together. The circumferential offset of the threads also can improve the strength of the threaded connection between the support frame 506 and the construction plug 538 by anchoring the support frame 506 and the construction plug 538 to opposing sides of the set screws 536.

While the threads 548, 552 are described and shown as partial threads, in other embodiments, it will be appreciated the threads 548 can be partial and/or fully helical. For instance, in an embodiment, the threaded openings 526 in the support frame 506 can be offset radially outward in the base portion 516 such that the cutouts are circular holes in the base portion 516 and the threads 548 can extend completely or partially around the holes. The combination of the second openings 544 and the cutouts 546 beneficially help maintain the longitudinal alignment of the set screws 536 relative to the construction plug 538 and the support frame 506 and reduce production costs.

In use, a small amount of mortar material can be applied around and/or below the support frame 506 with the construction plug 538 installed in the support frame 506 and the set screws 536 coupling the construction plug 538 to the support frame 506. A leveler can then be positioned on top of the support frame 506 to determine how level the support frame 506 is relative to horizontal.

Figure 14:
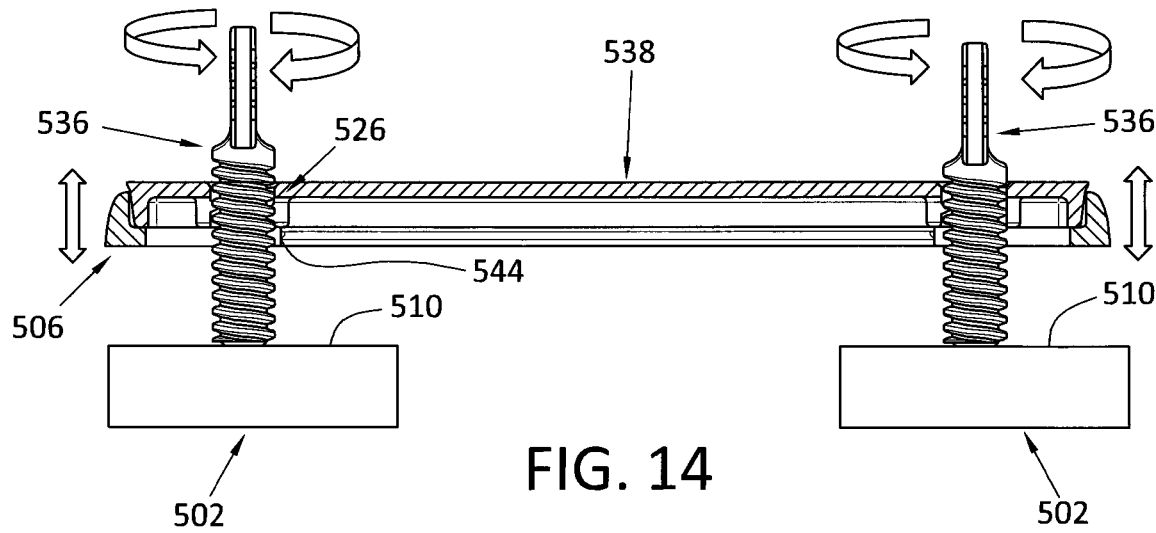
FIG. 14 is a cross section view of the drain system in FIG. 10.

An installer can then use fingers or a tool to selectively rotate one or more of the set screws 536 in the openings 526, 544 to level, angle, and/or adjust the height of the support frame 506 and the construction plug 538 as needed before the mortar material surrounding and/or supporting the support frame 506 is set. Referring to FIG. 14, the set screws 536 support on, but do not attach the support frame 506 to the drain fixture 502.

As discussed above, the threads 548, 552 are arranged so that the construction plug 538 and the support frame 506 are held together as they move up and down the threads of the set screws 536. This allows the installer to selectively rotate one or more of the set screws 536 to tilt, raise and/or lower the support frame 506 relative to the upper surface 510 of the drain fixture 502. For instance, the installer can rotate all the set screws 536 together to raise or lower the entire support frame 506. Alternatively, the installer can rotate two of the set screws 536 along one side of the support frame 506 to raise or lower that side relative to the opposite side, angling the support frame 506. Alternatively, the installer can rotate one of the set screws 536 to raise or lower one region relative to the other regions of the support frame 506. The set screws 536 thus can serve to vertically adjust the support frame 506 and provide stability at the level the set screws 536 are set until mortar is set.

Once the mortar is set, the set tiles can be grouted with the construction plug 538 in place. As discussed above, openings in the structure of the fabric layer 530 allow the grout material to form a mechanical or micromechanical lock to the fabric layer 530.

According to a variation, a capture area A (shown in FIG. 19) is defined between an overhang formed by the construction plug 538 and a rounded upper surface of the wall portion 518. The capture area A is arranged to capture and at least in part fill with the grouting material, improving the transition between the grouting material and the support frame 506. After grouting, the set screws 536 and the construction plug 538 can be removed from the support frame 506.

Figure 15:
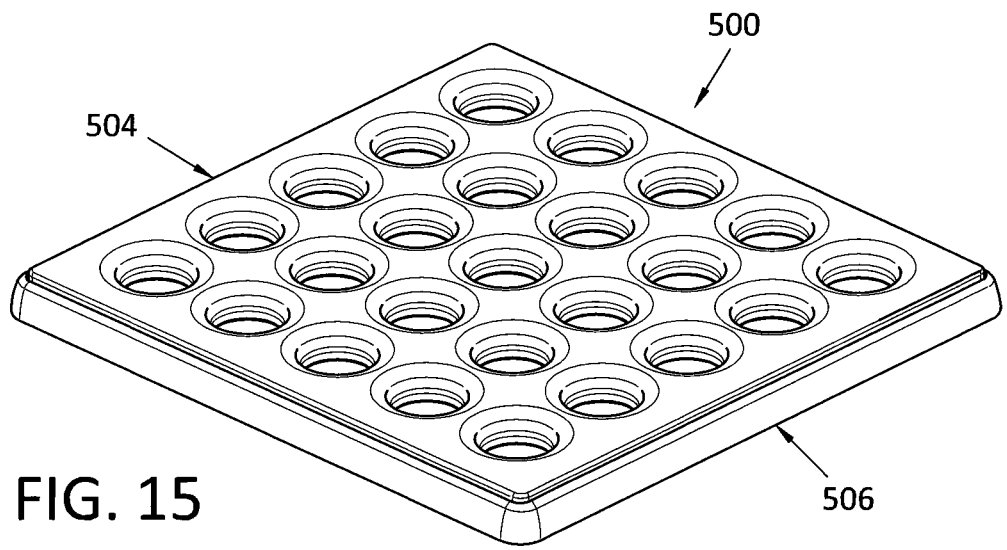
FIG. 15 is a side perspective view of the drain system in FIG. 10 including another drain cover.

The installer can then position a drain cover 504 comprising a drain grate having a perforated configuration in the support frame 506 and the drain system 500 is ready for use as shown in FIG. 15. The drain cover 504 and the construction plug 538 are sized and configured so that when the construction plug 538 is removed and the drain cover 504 is installed in the support frame 506, the upper surfaces of the drain cover 504 and the set tiles are substantially flush or flush with one another, enhancing the aesthetics and hydraulic properties of the drain system 500. The drain system 500 can thus allow for easier and faster installation of tile floors that are more appealing than existing systems and which exhibit improved hydraulic properties.

Figure 16:
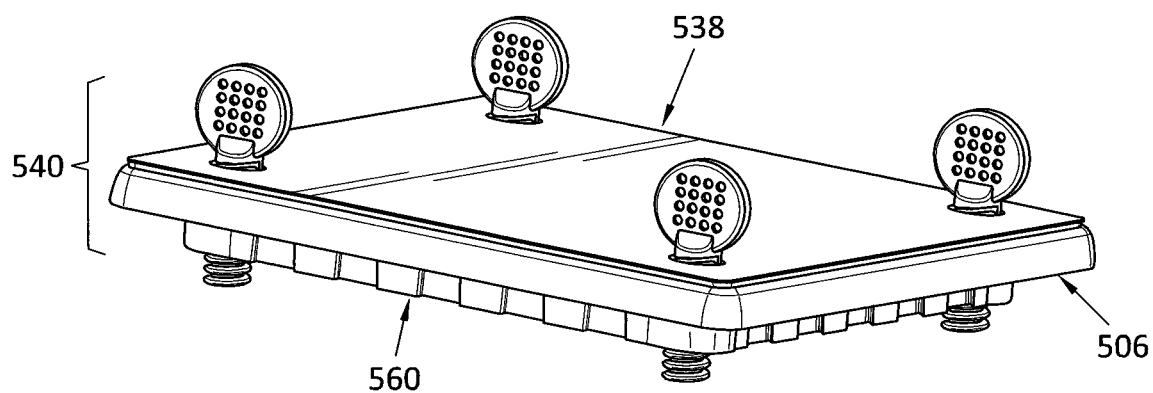
FIG. 16 is a side perspective view of a drain system according to another embodiment.
Figure 17:
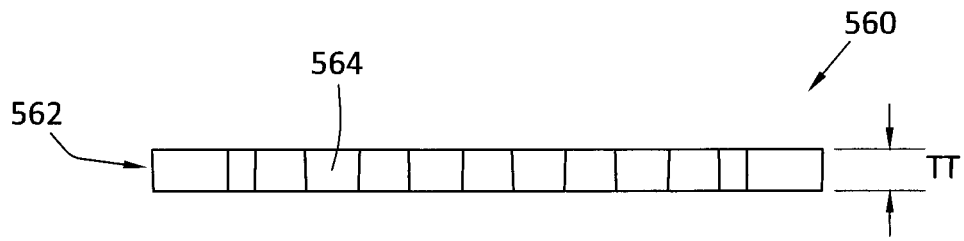
FIG. 17 is a side view of the extension member in FIG. 16.
Figure 18:
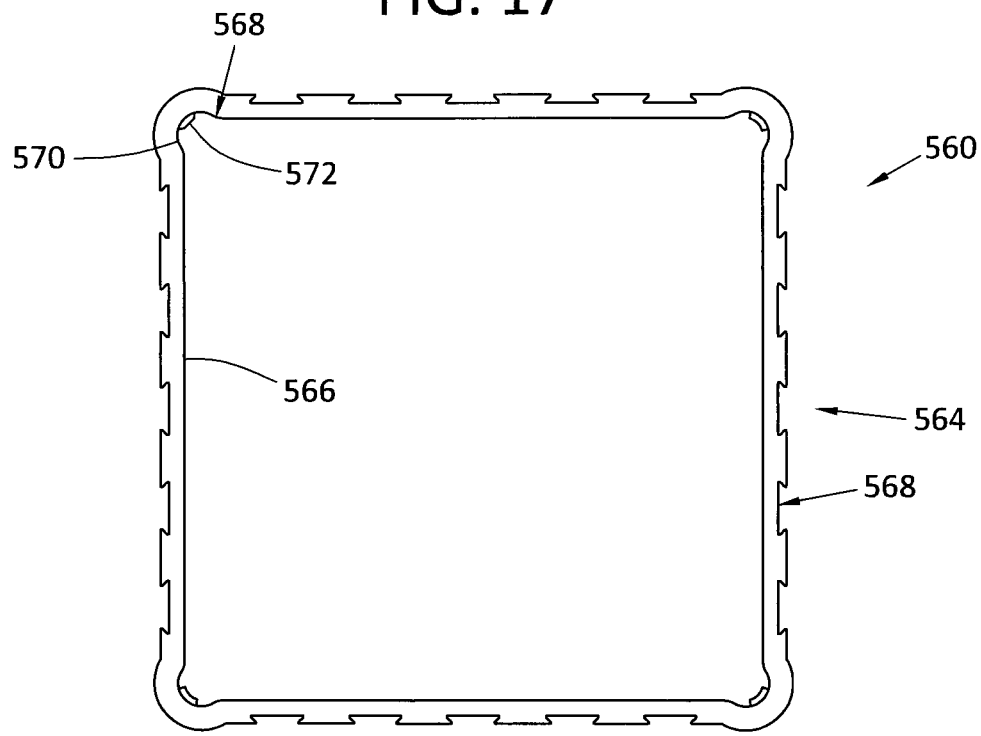
FIG. 18 is a top view of the extension member in FIG. 16.

Optionally, the drain system 500 can include an extension member 560 or skirt as shown in FIGS. 16 and 17. The extension member 560 can be coupled or attached to the bottom of the support frame 506 via the locking system 540 such that the extension member 560, the support frame 506, and the construction plug 538 are held together. This effectively increases an overall thickness of the drain system 500 as needed relative to the upper surface 510 of the drain fixture 502. For example, in some installations, the upper surface 510 of the drain fixture directly below the support frame 506 can be recessed more than in other installations. To help accommodate this greater distance between the tile surface and the upper surface 510, the extension member 560 can be selectively coupled or attached to the bottom of the support frame 506 via the locking system 540. This increases the overall thickness of the drain system 500 to help span the distance between the upper surface 510 and the upper surface of the set tiles, which, in turn, helps the drain system 500 more easily match the upper surface of the drain cover 504 with the set tiles. It also provides structural support to the support frame 506, helping to reinforce the support frame 506 against collapsing or bending during use. The extension member 560 or skirt can be formed of any suitable material.

In the illustrated embodiment, the extension member 560 comprises a frame member defining a thickness TT extending between an upper and lower surface. The thickness TT can be varied to fit different types of drain fixtures. For instance, the extension member 560 can be made in available in different sizes having a medium thickness TT, a small thickness TT, a large thickness TT, and/or an extra-large thickness TT.

The extension member 560 includes a wall portion 562 defining a grout facing surface 564 or outer perimeter, and an inner surface 566 opposing the grout facing surface 564 and defining the inner perimeter of the extension member 560. The grout facing surface 564 can be radially inset relative to the tile-facing surface 520 of the support frame 506. This beneficially leaves a greater portion of the bottom surface of the base portion 516 exposed, which, in turn, provides a greater attachment area between the support frame 506 and surrounding grout material.

According to a variation, the grout facing surface 564 defines one or more grout locking features configured to mechanically interlock the extension member 560 with surrounding grout material. The wall portion 562 can also provide a physical barrier that helps limit or prevent the grout material from entering a drain opening of the drain system 500. This improves the aesthetics of the drain system 500 because the grout material is not exposed. It also helps prevent unintentional fouling of the drain fixture from the grout material.

Like the support frame 506 and the construction plug 538, the inner periphery or inner surface 566 includes a third plurality of openings 568 configured to mechanically attach the extension member 560 to the support frame 506. The third openings 568 can comprise receiving spaces or pockets 570 formed in the inner surface 566 of the wall portion 562 and vertically alignable with the first and second openings 526, 544. Each third opening 568 defines at least one thread 572 having a partial circumferential configuration arranged to threadedly engage the set screws 536 when the extend through the second openings 544 into the third openings 568.

In an embodiment, the at least one thread 572 can comprise a quarter thread or one, two, three, or any other number of threads. The threads can have any suitable thread shape. As seen in FIG. 19, the set screw 536 can mesh with the thread 552 on the construction plug 538, the thread 548 on the support frame 506, and the thread 572 on the extension member 560 to lock all the components together. In an embodiment, the threads 548, 552, and 572 can have a common thread geometry and clocking. This beneficially helps ensure proper alignment and function regardless of the support frame 506, the construction plug 538, and the extension member 560 being randomly rotated and assembled.

While the drain system 500 is shown having a square shape, it will be appreciated that the drain system can be configured to have any suitable shape. Further, while the locking system is described as both a coupling and providing a height adjustment means, in other embodiments, it will be appreciated that the coupling means, and the height adjustment means can be separate.

Figure 22:
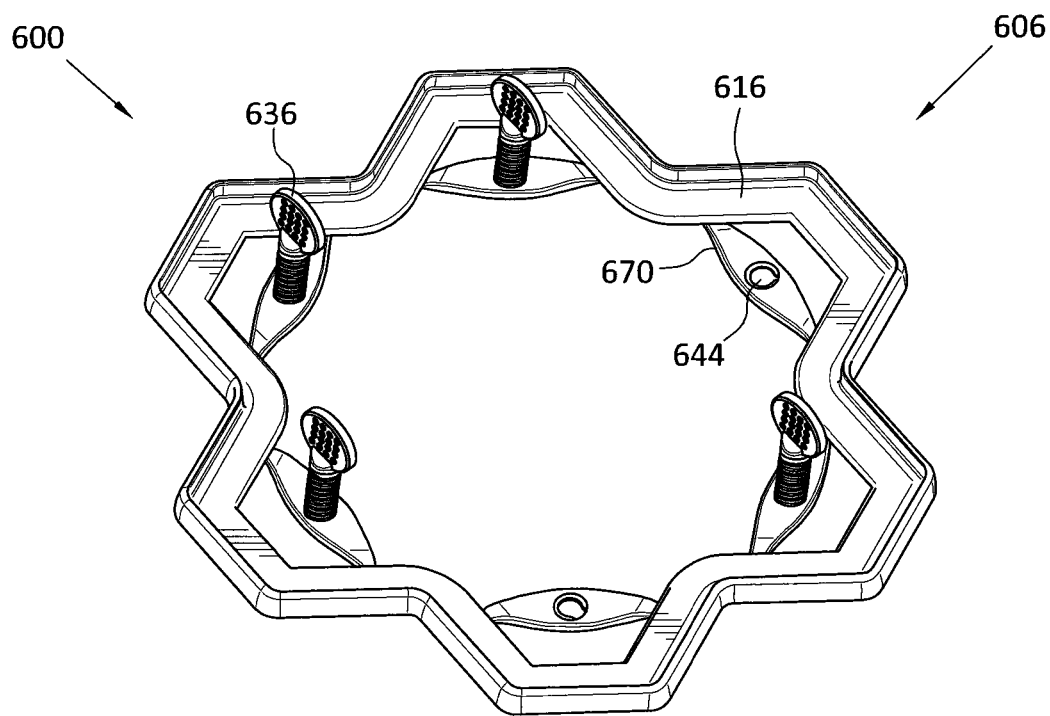
FIG. 22 is a top perspective view of the support frame in FIG. 20 with the drain cover removed for ease of reference.
Figure 23:
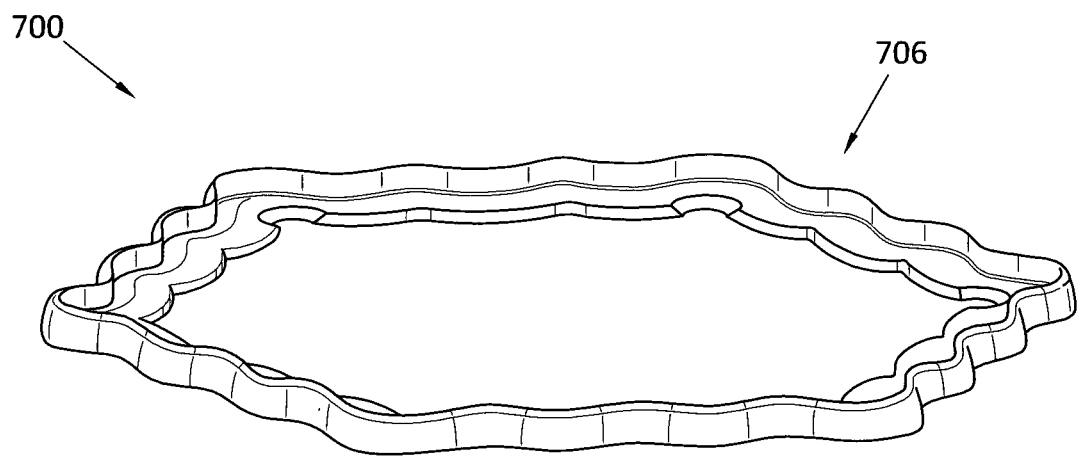
FIG. 23 is a side perspective view of a drain system according to another embodiment.

FIGS. 20-22 illustrate yet another embodiment of a drain system 600. It will be appreciated that the drain system 600 can include the same or similar features as the other embodiments described herein. The drain system 600 comprises a support frame 606 configured to support and position a drain cover or a construction plug 638 over a drain opening in a tile floor, and a locking system 640 configured to selectively and temporarily lock the support frame 606 and the construction plug 638 together.

The drain system 600 is like the drain system 500 except that the support frame 606 and the construction plug 638 have a trapezoidal shape.

The locking system 640 includes a plurality of fasteners or set screws 636, a first plurality of openings 626 defined in the construction plug 638, and a second plurality of openings 644 defined on the support frame 606. Like in the previous embodiment, the first and second openings 626, 644 can each include at least one thread 648, 652 configured to mesh with the set screws 636 and lock the support frame 606 and the construction plug 638 together. In the illustrated embodiment, the thread 648 and the thread 652 are partial threads but in other embodiments they can be complete and/or partial threads.

In the illustrated embodiment, the second openings 644 are formed in a plurality of tabs 670 removably attached to the base portion 616 rather than in the base portion 616. In use, an installer can use fingers or a tool to selectively rotate one or more of the set screws 636 in the openings 626, 644 to level, angle and/or adjust the vertical position or height of the support frame 606 and the construction plug 638 as needed before mortar material surrounding and/or supporting the support frame 606 is set. After the mortar material is set and grouting, the set screws 636, the construction plug 638, and the tabs 670 can be removed from the support frame 606. This is beneficial because the vertical position of the support frame 606 can be adjusted without having to rotate the support frame 606 or drain head as in the prior art. In addition, the angle of the support frame 606 can be adjusted as desired. Moreover, the set screws 636 provide stability at the level they are set to until mortar solidifies.

According to a variation, each tab 670 includes a pair of breakage points for selectively separating the tab 670 from the base portion 616 upon the application of a target force to the tab 670. The breakage points can be weaker than the remainder of the support frame 606 so that the installer can apply a force to the tabs 670 and cause the tabs 670 to break at the breakage points. In other embodiments, the tabs 670 can be cut away from the base portion 616 by the installer. In other embodiments, the tabs 670 may be remain attached to the base portion 616 after an installation.

The installer can then position a drain cover comprising a drain grate having a perforated configuration in the support frame 606 and the drain system 600 is ready for use. The drain system 600, like other embodiments, can allow for easier and faster installation of tile floors that are more appealing than existing systems and which exhibit improved hydraulic properties.

FIG. 22 illustrates yet another embodiment of a drain system 700. It will be appreciated that the drain system 700 can have the same or similar features as the other embodiments described herein. The drain system 700 includes a support frame 706 alternatively having a cloud, penny, or irregularly shaped outer periphery.

The various aspects and embodiments disclosed herein are for purposes of illustration and are not intended to be limiting. For instance, while the fabric layer is described attached to a vertically extending surface of the support frame, in other embodiments the fabric layer can be integrated with a vertically extending surface of a drain riser, a drain cover, a drain body, or other component to better lock grout between the component and adjacent tiles. While the support frame is generally described as being surrounded by a plurality of tiles, in other embodiments, the support frame can be surrounded by one tile. While set screws are described, in other embodiments the drain systems can include other vertical or height adjustment mechanisms. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A drain system comprising:
 a support frame configured to support and position a drain cover over a drain opening in a tile floor, the support frame including:
  a base portion;
  a wall portion projecting upwardly from the base portion to define a seat for the drain cover within the support frame, the wall portion defining a cover-facing surface arranged to interface with the drain cover, and a tile-facing surface arranged to face one or more tiles surrounding the support frame; and one or more material locking features on the tile-facing surface configured to enhance retention of grout applied between the support frame and the one or more tiles surrounding the support frame, the one or more material locking features defining a plurality of openings such that when the grout is applied to the tile-facing surface the grout penetrates and forms a mechanical or micromechanical lock with the one or more material locking features, wherein during an installation of the support frame in the tile floor a vertical position of the support frame over the drain opening is adjustable and the support frame does not extend downwardly into the drain opening such that the support frame is floatable over the drain opening for lateral and rotational adjustment of the support frame relative to the drain opening.

2. The drain system of claim 1, wherein the vertical position of the support frame over the drain opening is adjustable via a plurality of set screws threadedly attached to the base portion.

3. The drain system of claim 1, wherein an angle of the support frame over the drain opening is adjustable relative to the drain opening.

4. The drain system of claim 1, wherein the one or more material locking features comprises at least one fabric layer molded on the tile-facing surface.

5. The drain system of claim 4, wherein the at least one fabric layer comprises a polyester material having a non-woven construction.

6. The drain system of claim 4, wherein the at least one fabric layer comprises a Polyethylene material.

7. The drain system of claim 4, wherein the at least one fabric layer includes a tileable flap that is movable or foldable relative to a connection between the tileable flap and a bottom of the wall portion or a bottom of the support frame.

8. The drain system of claim 7, wherein the tileable flap is configured to extend below at least a portion of the one or more tiles surrounding the support frame and a substrate attached to the one or more tiles surrounding the support frame.

9. The drain system of claim 1, wherein the drain cover comprises a temporary construction plug having a solid configuration positionable in the support frame during a tile installation project and defining a plurality of access holes corresponding to a plurality of set screws in the support frame such that at least one of the vertical position and an angle of the support frame relative to the drain opening is adjustable with the construction plug positioned in the support frame.

10. The drain system of claim 9, wherein the temporary construction plug is interchangeable with a drain grate having a perforated configuration.

11. The drain system of claim 1, wherein the drain cover comprises a temporary construction plug having a solid configuration positionable in the support frame during a tile installation project.

12. The drain system of claim 11, wherein the temporary construction plug is arranged to form a reversible snap-fit within the support frame when the temporary construction plug is positioned in the support frame.

13. The drain system of claim 12, wherein a height and an angle of the support frame over the drain opening is adjustable via a plurality of set screws threadedly attached to the temporary construction plug.

14. The drain system of claim 13, wherein the set screws are located at least in part radially inside of the base portion of the support frame.

15. A drain system comprising:
a drain cover comprising a construction plug;
a support frame configured to support and position the construction plug over a drain opening in a tile floor, the support frame including a base portion and a wall portion projecting upwardly from the base portion to define a seat for the construction plug within the support frame, wherein during an installation of the support frame in the tile floor a vertical position of the support frame over the drain opening is adjustable and the support frame does not extend downwardly into the drain opening such that the support frame is floatable over the drain opening for lateral and rotational adjustment of the support frame relative to the drain opening;
one or more material locking features on a tile-facing surface of the wall portion configured to enhance retention of grout applied between the support frame and the one or more tiles surrounding the support frame, the one or more material locking features defining a plurality of openings such that when the grout is applied to the tile-facing surface the grout penetrates and forms a mechanical or micromechanical lock with the one or more material locking features; and
a locking system arranged to selectively and temporarily lock the construction plug and the support frame together during installation of the tile floor.

16. The drain system of claim 15, wherein the locking system is configured to adjust at least one of an angle and the vertical position of the support frame relative to the drain opening during installation of the tile floor.

17. The drain system of claim 15, wherein the locking system comprises a threaded connection between the support frame and a plurality of set screws including lower ends engaging with an upper surface of a drain fixture defining the drain opening.

18. The drain system of claim 17, wherein the lower ends of the plurality of set screws are unattached to the upper surface of the drain fixture.

19. A drain system comprising:
a drain fixture defining a drain opening;
a construction plug;
a support frame configured to support and position the construction plug over the drain opening on the drain fixture, the support frame including a base portion and a wall portion projecting upwardly from the base portion to define a seat for the construction plug within the support frame, wherein during an installation of the support frame in the tile floor a vertical position of the support frame over the drain opening is adjustable and the support frame does not extend downwardly into the drain opening such that the support frame is floatable over the drain opening for lateral and rotational adjustment of the support frame relative to the drain opening;
one or more material locking features on a tile-facing surface of the wall portion configured to enhance retention of grout applied between the support frame and the one or more tiles surrounding the support frame, the one or more material locking features defining a plurality of openings such that when the grout is applied to the tile-facing surface the grout penetrates and forms a mechanical or micromechanical lock with the one or more material locking features; and a locking system arranged to selectively and temporarily lock the construction plug and the support frame together during installation of a tile floor surrounding the drain opening.

\* \* \* \* \*